(12) United States Patent
Murakami et al.

(10) Patent No.: US 12,132,352 B2
(45) Date of Patent: Oct. 29, 2024

(54) STATOR COOLING STRUCTURE

(71) Applicant: AISIN CORPORATION, Kariya (JP)

(72) Inventors: Satoshi Murakami, Nishio (JP); Masahiro Nagaya, Toyota (JP)

(73) Assignee: AISIN CORPORATION, Kariya (JP)

( * ) Notice: Subject to any disclaimer, the term of this patent is extended or adjusted under 35 U.S.C. 154(b) by 553 days.

(21) Appl. No.: 15/734,501

(22) PCT Filed: Mar. 26, 2019

(86) PCT No.: PCT/JP2019/012825
§ 371 (c)(1),
(2) Date: Dec. 2, 2020

(87) PCT Pub. No.: WO2020/017101
PCT Pub. Date: Jan. 23, 2020

(65) Prior Publication Data
US 2021/0234416 A1    Jul. 29, 2021

(30) Foreign Application Priority Data
Jul. 19, 2018    (JP) .................................. 2018-135662

(51) Int. Cl.
| | |
|---|---|
| H02K 5/20 | (2006.01) |
| H02K 1/20 | (2006.01) |
| H02K 9/19 | (2006.01) |
| H02K 9/197 | (2006.01) |

(52) U.S. Cl.
CPC .............. *H02K 1/20* (2013.01); *H02K 5/203* (2021.01); *H02K 9/197* (2013.01)

(58) Field of Classification Search
CPC .................................. H02K 9/00; H02K 1/20
See application file for complete search history.

(56) References Cited

U.S. PATENT DOCUMENTS

| | | | |
|---|---|---|---|
| 6,489,698 B2* | 12/2002 | Csicser ................. | H02K 5/203 310/58 |
| 6,727,611 B2* | 4/2004 | Bostwick ............... | H02K 5/203 310/58 |
| 9,356,492 B2* | 5/2016 | Chamberlin ........... | H02K 5/203 |

(Continued)

FOREIGN PATENT DOCUMENTS

| | | |
|---|---|---|
| DE | 102016110658 A1 | 12/2017 |
| JP | 2001-238406 A | 8/2001 |
| JP | 2004-112968 A | 4/2004 |

(Continued)

OTHER PUBLICATIONS

Jul. 8, 2021 Search Report issued in European Patent Application No. 19838281.4.

(Continued)

*Primary Examiner* — Tran N Nguyen
(74) *Attorney, Agent, or Firm* — Oliff PLC

(57) ABSTRACT

A stator cooling structure in which the stator cooling structure includes a supporting member that has a cylindrical shape along an axial direction of a rotating electric machine, that supports a stator core of the rotating electric machine, and that forms a cooling water passage and oil passage, and the stator core, the cooling water passage, and the oil passage are disposed adjacent to each other in this order from an inner radial side.

6 Claims, 19 Drawing Sheets

(56) References Cited

U.S. PATENT DOCUMENTS

2014/0265659 A1    9/2014  Chamberlin et al.
2015/0214817 A1*   7/2015  Kim ...................... H02K 9/197
                                                          310/54

FOREIGN PATENT DOCUMENTS

| JP | 2010-263715 A | 11/2010 |
| JP | 2010-268633 A | 11/2010 |
| JP | 2010-273423 A | 12/2010 |
| JP | 2012-023837 A | 2/2012 |
| JP | 2015-104214 A | 6/2015 |
| WO | 2013/118703 A1 | 8/2013 |

OTHER PUBLICATIONS

Jun. 18, 2019 International Search Report issued in International Patent Application No. PCT/JP2019/012825.

* cited by examiner ial direction of a rotating electric machine, and in which a cooling water passage is formed in a housing (for example, see Patent Document 1).

STATOR COOLING STRUCTURE

TECHNICAL FIELD

The present disclosure relates to a stator cooling structure.

BACKGROUND ART

A technique is known in which a clearance portion for enclosing or circulating a heat transfer body (cooling oil) is formed between a stator core and a stator holder in a radial direction of a rotating electric machine, and in which a cooling water passage is formed in a housing (for example, see Patent Document 1).

RELATED ART DOCUMENTS

Patent Documents

Patent Document 1: Japanese Unexamined Patent Application Publication No. 2010-273423 (JP 2010-273423 A)

SUMMARY OF THE INVENTION

Problem to be Solved by the Disclosure

However, it is difficult to efficiently cool the stator core with the above-described related art. Cooling oil is generally radiated by exchanging heat with cooling water (for example, water containing LLC (long life coolant)) in an oil cooler. Thus, the temperature of the cooling water is lower than that of the cooling oil. Therefore, if there is cooling oil between the cooling water and the stator core as in the above-described related art, it is difficult to efficiently cool the stator core.

Thus, in one aspect, an object of the present disclosure is to efficiently cool the stator core.

Means for Solving the Problem

According to one aspect of the present disclosure, a stator cooling structure is provided, the stator cooling structure including a supporting member that has a cylindrical shape along an axial direction of a rotating electric machine, that supports the stator core of the rotating electric machine, and that forms a cooling water passage and an oil passage, in which the stator core, the cooling water passage, and the oil passage are disposed adjacent to each other in this order from an inner radial side.

Effects of the Invention

According to the present disclosure, it is possible to efficiently cool the stator core.

MODES FOR CARRYING OUT THE DISCLOSURE

Hereinafter, each embodiment will be described in detail with reference to the accompanying drawings. Here, first, a vehicle drive device and a lubrication/cooling system (lubrication/cooling system including a stator cooling structure) to which the stator cooling structure can be applied are described, and then, a heat exchange/water cooling portion according to the stator cooling structure will be described.

<Vehicle Drive Device>

Figure 1:
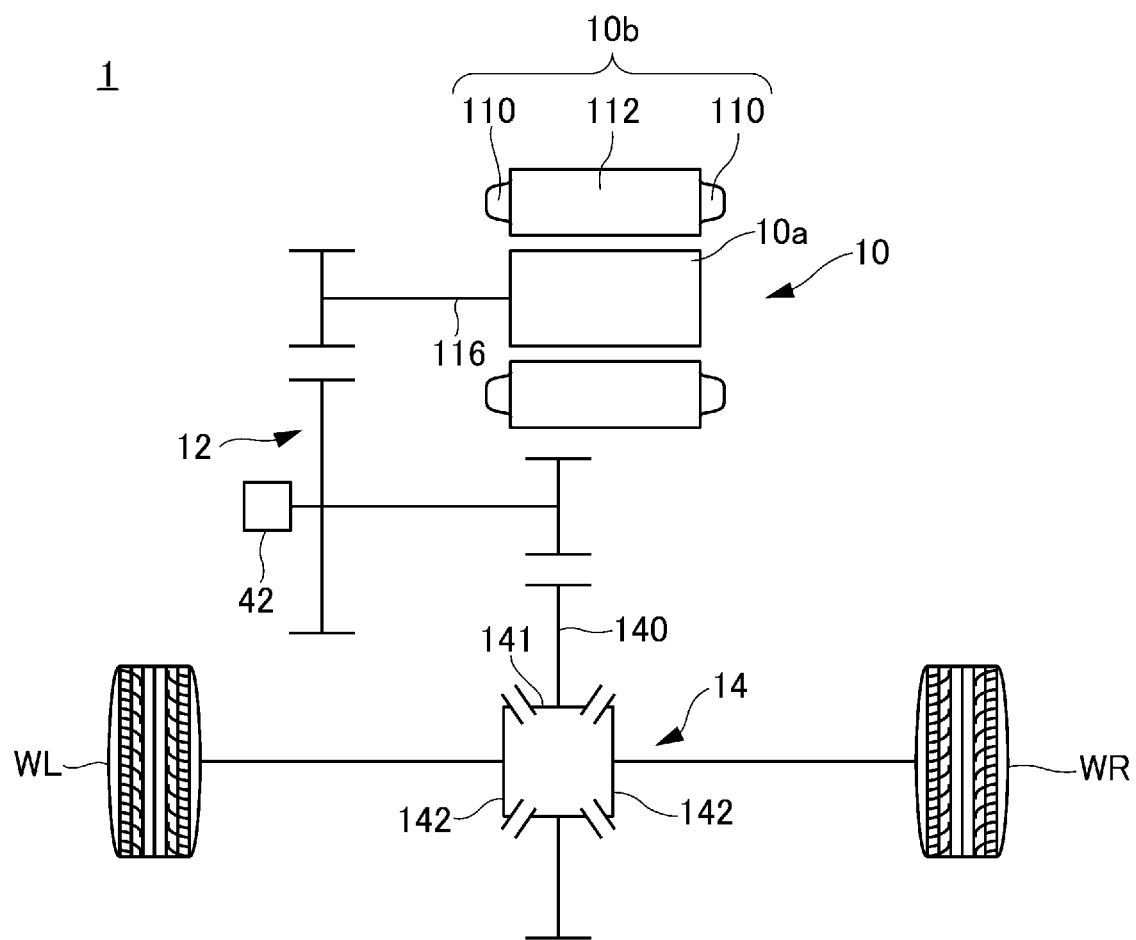
FIG. 1 is a diagram schematically showing an example of a vehicle drive device.

FIG. 1 is a diagram schematically showing an example of a vehicle drive device 1 to which the stator cooling structure can be applied. Drive wheels WL, WR are also shown in FIG. 1.

The vehicle drive device 1 is mounted on a vehicle. The vehicle drive device 1 includes a motor 10 (an example of a rotating electric machine), a speed reduction mechanism 12, and a differential device 14 coupled to an output shaft 116 of the motor 10 via the speed reduction mechanism 12. The motor 10 generates a driving force of the vehicle. The motor 10 includes a rotor 10a and a stator 10b, and the stator 10b includes a stator core 112 and a coil end 110 formed by a coil (not shown) mounted on the stator 10b. The stator core 112 may be formed of laminated steel plates, for example. The left and right drive wheels WL, WR are connected to a differential device 14. The differential device 14 includes a ring gear 140, a pinion gear 141, and side gears 142. Further, the differential device 14 includes a differential case (not shown) that houses gears (the pinion gear 141, the side gears 142, etc.) inside. The configuration of the speed reduction mechanism 12 is not limited to the simple configuration that is illustrated, and may include a planetary gear mechanism. Each component of the vehicle drive device 1 (the motor 10, the speed reduction mechanism 12, the differential device 14, etc.) may be incorporated in a housing (not shown) as a single vehicle drive device unit, or may be incorporated in a plurality of different housings (not shown).

The vehicle drive device 1 includes a lubrication/cooling system 3 for lubricating and/or cooling the motor 10, the speed reduction mechanism 12, and the differential device 14 with oil. Hereinafter, "lubrication/cooling" means at least one of lubrication and cooling.

A stator cooling structure 402 (see FIG. 2) according to an embodiment described later is applied to the motor 10 of the vehicle drive device 1 shown in FIG. 1 as an example. However, the stator cooling structure 402 is also applicable to a motor included in a vehicle drive device having a configuration other than the vehicle drive device 1. That is, the stator cooling structure 402 described below can be applied to a vehicle drive device having any configuration including a motor such as the motor 10. Further, the stator cooling structure 402 can be applied to a configuration including a generator (another example of a rotating electric machine) instead of the motor.

<Lubrication/cooling System>

Figure 2:
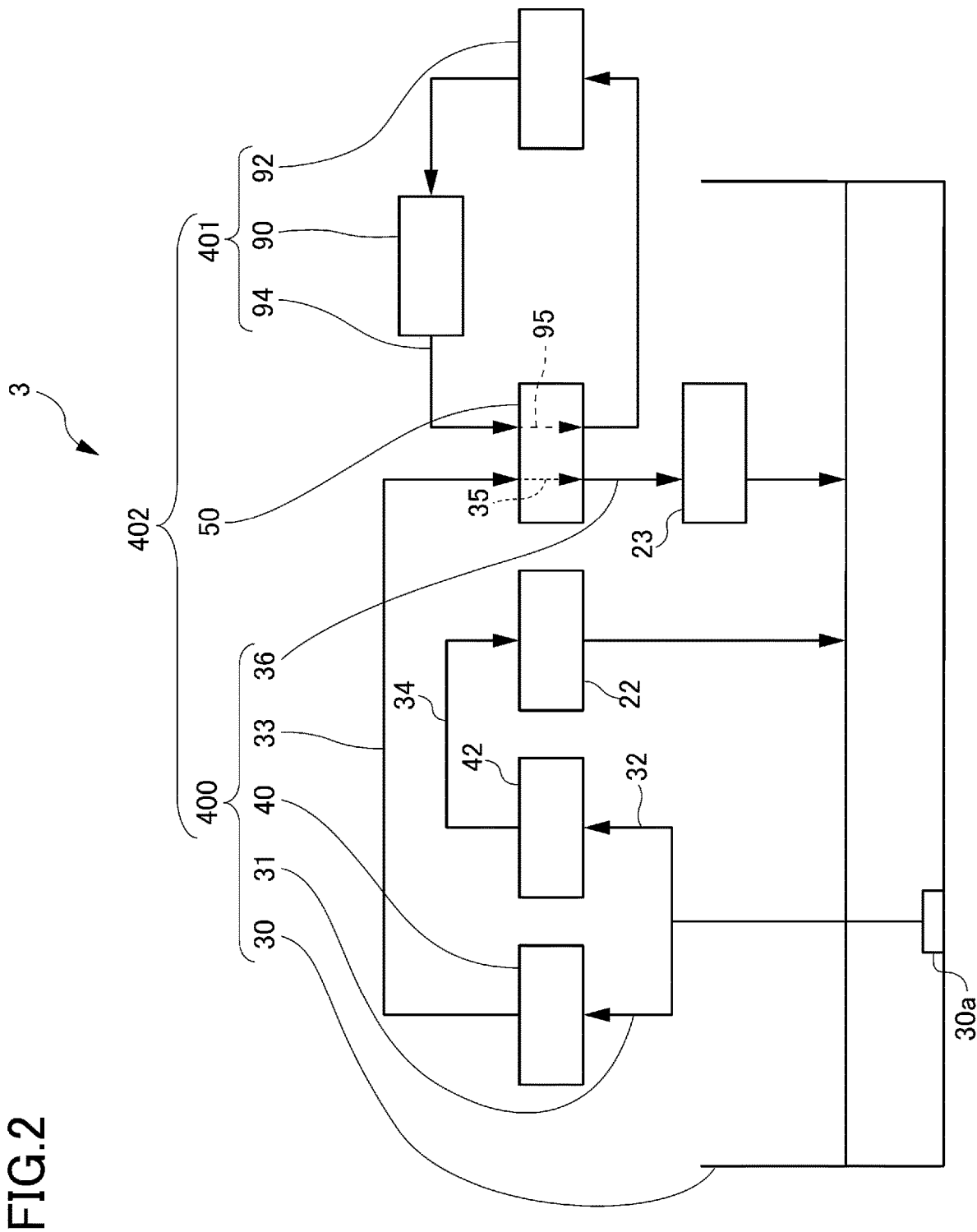
FIG. 2 is a diagram schematically showing an example of a structure of a lubrication/cooling system for the vehicle drive device.

FIG. 2 is a diagram schematically showing an example of the configuration of the lubrication/cooling system 3 of the vehicle drive device 1.

The lubrication/cooling system 3 includes a tank 30, oil passages 31 to 36, an electric oil pump 40, a mechanical oil pump 42, a heat exchange/water cooling portion 50, a water pump 90, a radiator 92, and cooling water passages 94, 95.

The tank 30 is formed by a lowermost portion (a lowermost space in a lowermost direction) in the housing of the vehicle drive device 1. The tank 30 is formed of, for example, an oil pan. The differential device 14 is arranged in the tank 30, and the differential device 14 is immersed in the oil in the tank 30. The differential device 14 is provided at a predetermined height that is defined in advance with respect to a lower surface of the tank 30. The predetermined height is determined such that when the height of the oil surface of the tank 30 is equal to or higher than a predetermined height that is defined in advance, the oil in the tank 30 enters the differential case as the differential device 14 rotates (as the differential case rotates), and lubrication and cooling of the differential device 14 is achieved in the desired manner. A strainer 30a is provided on the lower surface of the tank 30.

The oil passage 31 is provided between the tank 30 and a suction side of the electric oil pump 40. When the electric oil pump 40 is operated, the oil in the tank 30 is sucked into a suction inlet of the electric oil pump 40 via the strainer 30a and the oil passage 31.

The oil passage 32 is provided between the tank 30 and a suction side of the mechanical oil pump 42. When the mechanical oil pump 42 operates, the oil in the tank 30 is sucked into the suction inlet of the mechanical oil pump 42 via the strainer 30a and the oil passage 32. In the example shown in FIG. 2, the oil passage 32 has a common part with the oil passage 31. However, there may be no such common part and the oil passage 32 may be formed independently of the oil passage 31.

The oil passage 33 is provided between a discharge side of the electric oil pump 40 and an inlet side of the heat exchange/water cooling portion 50. The oil passage 33 guides the oil discharged from the electric oil pump 40 to the heat exchange/water cooling portion 50. Therefore, the oil discharged from the electric oil pump 40 is cooled by the heat exchange/water cooling portion 50 and then supplied to the oil passage 36.

The oil passage 34 is provided between the discharge side of the mechanical oil pump 42 and the tank 30. The oil passage 34 guides the oil discharged from the mechanical oil pump 42 to the tank 30. The oil passage 34 may include an oil passage formed in a member, such as a shaft of a speed reduction mechanism, or may include a mere space. The mere space is a space inside the housing of the vehicle drive device 1. The oil from the oil passage 34 is provided for lubrication in a member to be lubricated (lubrication part 22). The lubrication part 22 is, for example, a bearing of the motor 10.

The oil passage 35 is connected between the oil passage 33 and the oil passage 36 so as to pass through the heat exchange/water cooling portion 50. As described later, the oil in the oil passage 35 is cooled by a liquid coolant (cooling water) passing through the cooling water passage 95. Details of the oil passage 35 will be described later.

The oil passage 36 is provided between an outlet side of the heat exchange/water cooling portion 50 and the tank 30. The oil passage 36 guides the oil from the heat exchange/water cooling portion 50 to the tank 30. The oil passage 36 may be an oil passage formed on a member such as an oil passage formed on the shaft of the speed reduction mechanism, or an oil passage formed by a pipe. However, the oil passage 36 includes the space in the housing of the vehicle drive device 1 or of the motor 10 (such as a case 70 in FIG. 3), for example. In this case, after the oil from the heat exchange/water cooling portion 50 is dropped by gravity and is supplied to the member to be cooled (cooled part 23), the oil is guided to the tank 30 by gravity. The cooled part 23 includes, for example, the coil end 110 (see FIG. 1) of the stator 10b of the motor 10.

The electric oil pump 40 is driven by a dedicated drive source (not shown) such as a motor. The electric oil pump 40 discharges the oil in the tank 30 to the oil passage 33 during operation. That is, the electric oil pump 40 sucks the oil in the tank 30 through the oil passage 31 and discharges the oil to the oil passage 33 during operation. The oil discharged to the oil passage 33 is guided to the oil passage 36 via the heat exchange/water cooling portion 50. The electric oil pump 40 operates independently of the rotation of the wheels, and is an electrically operated oil pump. The electric oil pump 40, together with the tank 30, the oil passage 31, the oil passage 33, and the oil passage 36, forms an oil circulation portion 400 that circulates oil through the oil passage 35. However, in a modification, the oil circulation portion 400 may include other elements.

During operation, the mechanical oil pump 42 sucks the oil in the tank 30 through the oil passage 32 and discharges the oil to the oil passage 34. The mechanical oil pump 42 operates with the forward rotation (rotation in the forward direction) of the wheels. The mechanical oil pump 42 may be provided for any rotating member that rotates with the forward rotation of the wheels. For example, the mechanical oil pump 42 is provided on a counter shaft of the speed reduction mechanism 12 (see FIG. 1) and is operated by the forward rotation of the counter shaft of the speed reduction mechanism 12.

The heat exchange/water cooling portion 50 has both a heat exchange function and a stator core water cooling function. Specifically, the heat exchange/water cooling portion 50 has a heat exchange function of realizing heat exchange between the oil in the oil passage 35 and the cooling water in the cooling water passage 95, and also a function of directly cooling the stator core 112 of the stator 10b of the motor 10 with the cooling water (stator core water cooling function). The cooling water is, for example, water containing antifreeze liquid or an LLC (long life coolant).

The heat exchange/water cooling portion 50 also functions as an oil cooler, but is not the same as an oil cooler in that the heat exchange/water cooling portion 50 has a function of cooling the stator core 112 of the motor 10 as a function other than a function of the oil cooler. Since the lubrication/cooling system 3 includes the heat exchange/water cooling portion 50, an oil cooler separate from the heat exchange/water cooling portion 50 is unnecessary. In this embodiment, the heat exchange/water cooling portion 50 is applied to the motor 10. Details of the heat exchange/water cooling portion 50 will be described later.

The water pump 90 is a pump that circulates cooling water in the cooling water passages 94 and 95. The water pump 90, together with the radiator 92 and the cooling water passage 94, forms a cooling water circulation portion 401 that circulates the cooling water through the cooling water passage 95. However, in a modification, the cooling water circulation portion 401 may include other elements. The cooling water circulation portion 401, together with the oil circulation portion 400 and the heat exchange/water cooling portion 50 described above, forms the stator cooling structure 402. However, in a modification, the stator cooling structure 402 may include other elements.

The radiator 92 removes heat from the cooling water passing through the cooling water passages 94, 95 to cool the cooling water. The radiator 92 may realize heat exchange between air (for example, air passing when the vehicle is traveling) and cooling water.

The cooling water passage 94 guides the cooling water discharged from the water pump 90 to the cooling water passage 95 of the heat exchange/water cooling portion 50, and returns the cooling water from the cooling water passage 95 of the heat exchange/water cooling portion 50 to the water pump 90 via the radiator 92. The radiator 92 may be provided between the water pump 90 and the heat exchange/water cooling portion 50.

The cooling water passage 95 is formed in the heat exchange/water cooling portion 50. When the cooling water passes through the cooling water passage 95, it is possible to realize the heat exchange function and the stator core water cooling function of the heat exchange/water cooling portion 50 described above. Details of the cooling water passage 95 will be described later.

The cooling water passage 95 is formed in the heat exchange/water cooling portion 50. When the cooling water passes through the cooling water passage 95, it is possible to realize the heat exchange function and the stator core water cooling function of the heat exchange/water cooling portion 50 described above. Details of the cooling water passage 95 will be described later.

Further, in the example shown in FIG. 2, the oil passage 33 may be branched and connected to the oil passage 34. In this case, the oil from the electric oil pump 40 is also supplied to the lubrication part 22. Alternatively, the oil passage 36 may be branched and connected to the oil passage 34. In this case, the oil from the heat exchange/water cooling portion 50 is also supplied to the lubrication part 22. Alternatively, the oil passage 34 may be branched and connected to the oil passage 33. The oil passage 34 may be connected to and integrated with a downstream side of the cooled part 23 in the oil passage 36 on a downstream side of the lubrication part 22.

In the example shown in FIG. 2, the cooling water passage 94 is connected only to the heat exchange/water cooling portion 50. However, a member to be cooled may be formed so as to pass through an inverter (not shown) for driving the motor 10 or a high-voltage battery (not shown) that drives the motor 10, for example.

<Heat Exchange/Water Cooling Portion>

Next, the heat exchange/water cooling portion 50 according to the embodiment applied to the motor 10 will be described with reference to FIG. 3 and onward. In addition, in FIG. 3 and onward, there are cases in which only some elements are provided with reference signs regarding a plurality of elements, from the viewpoint of maintaining the clarity of the drawings.

Figure 3:
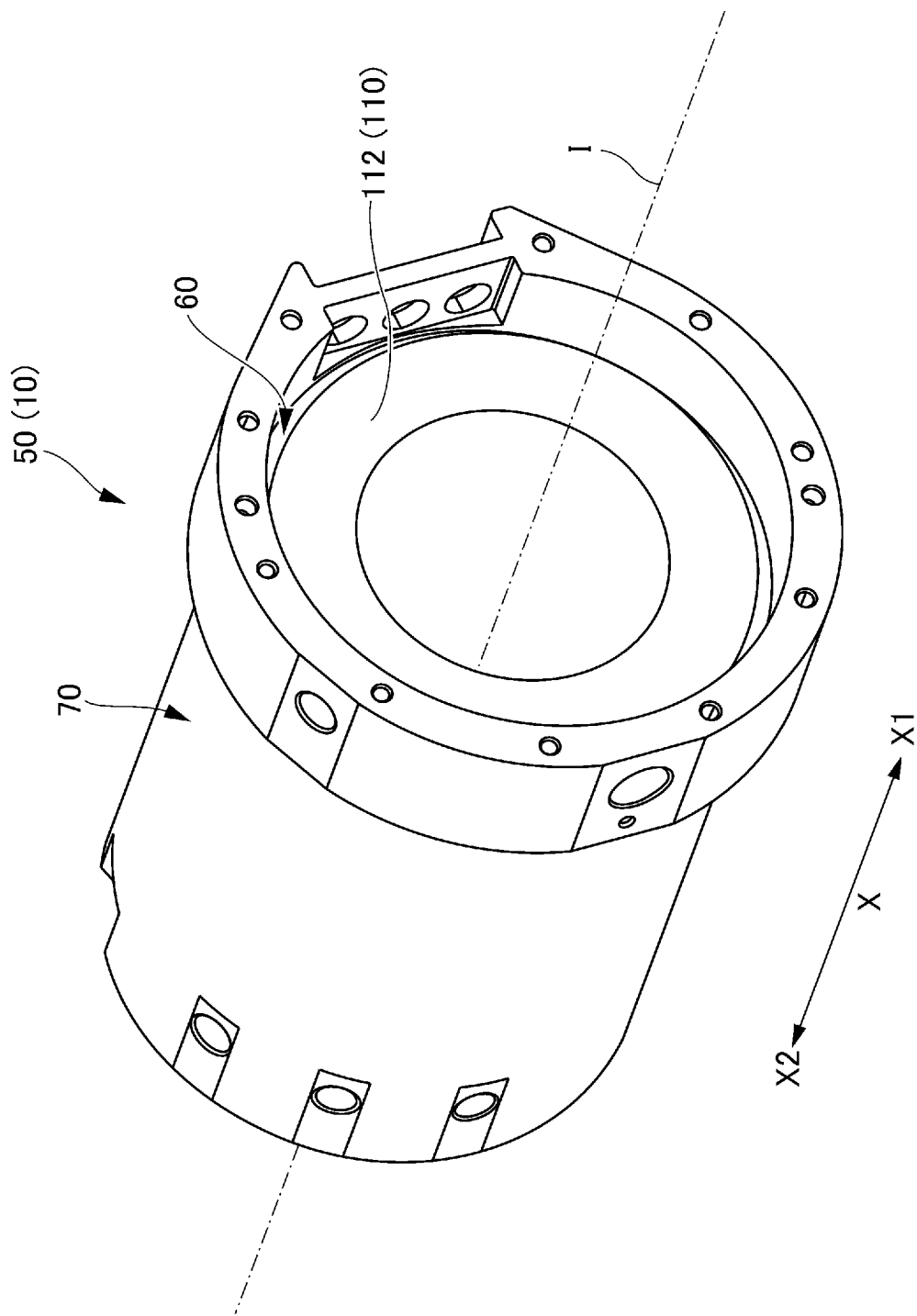
FIG. 3 is a perspective view showing the external appearance of a part of a motor.
Figure 4:
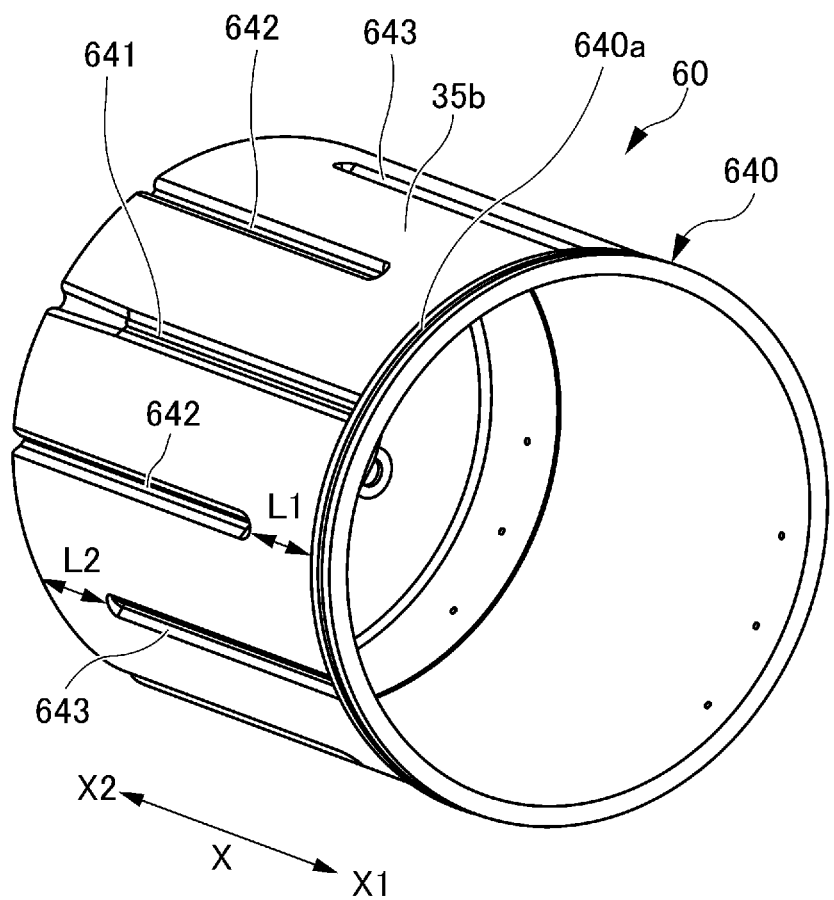
FIG. 4 is a perspective view of a retaining ring viewed in the same direction as FIG. 3.
Figure 5:
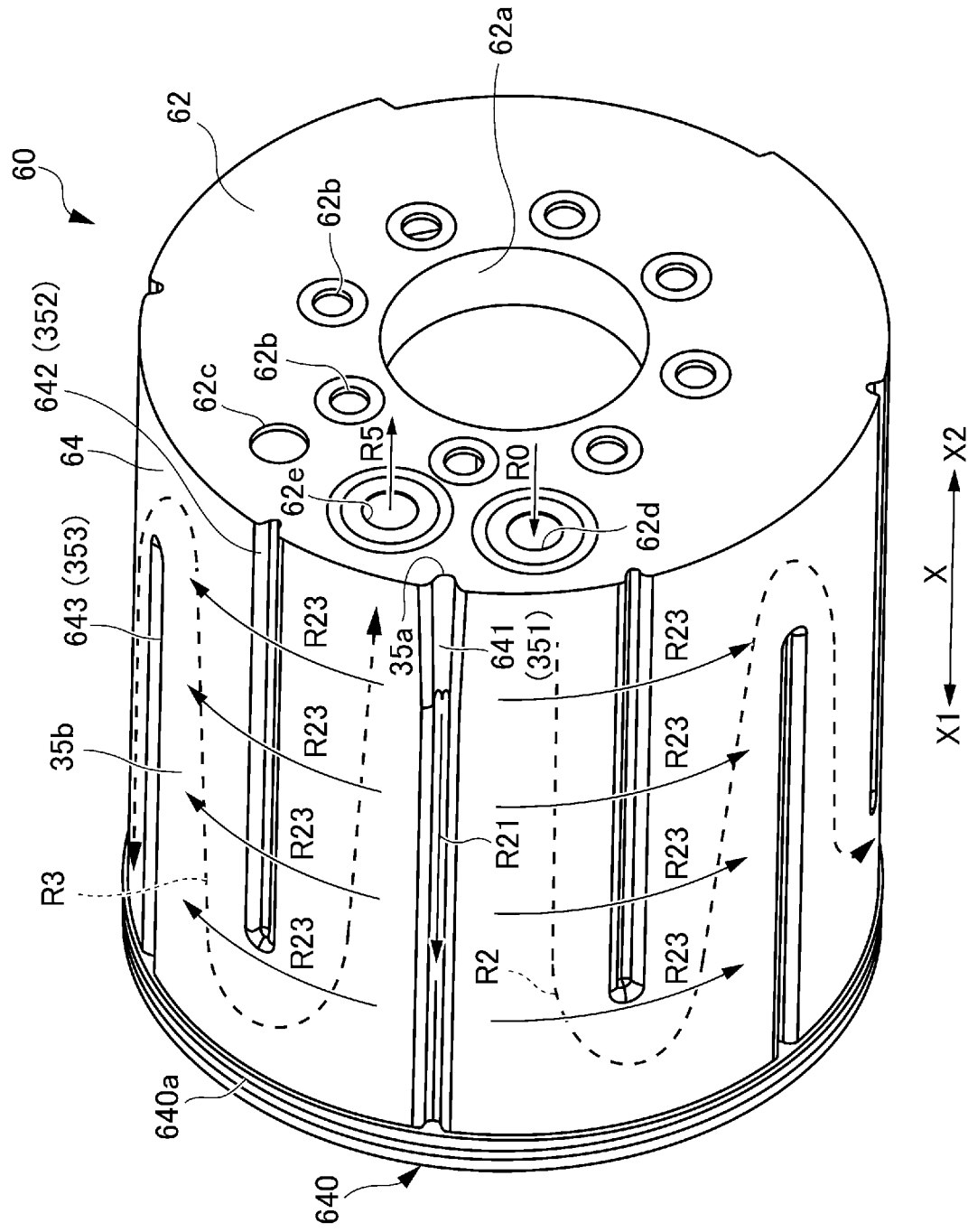
FIG. 5 is a perspective view of the retaining ring viewed from an X2 side in an X direction (see FIG. 4).
Figure 6:
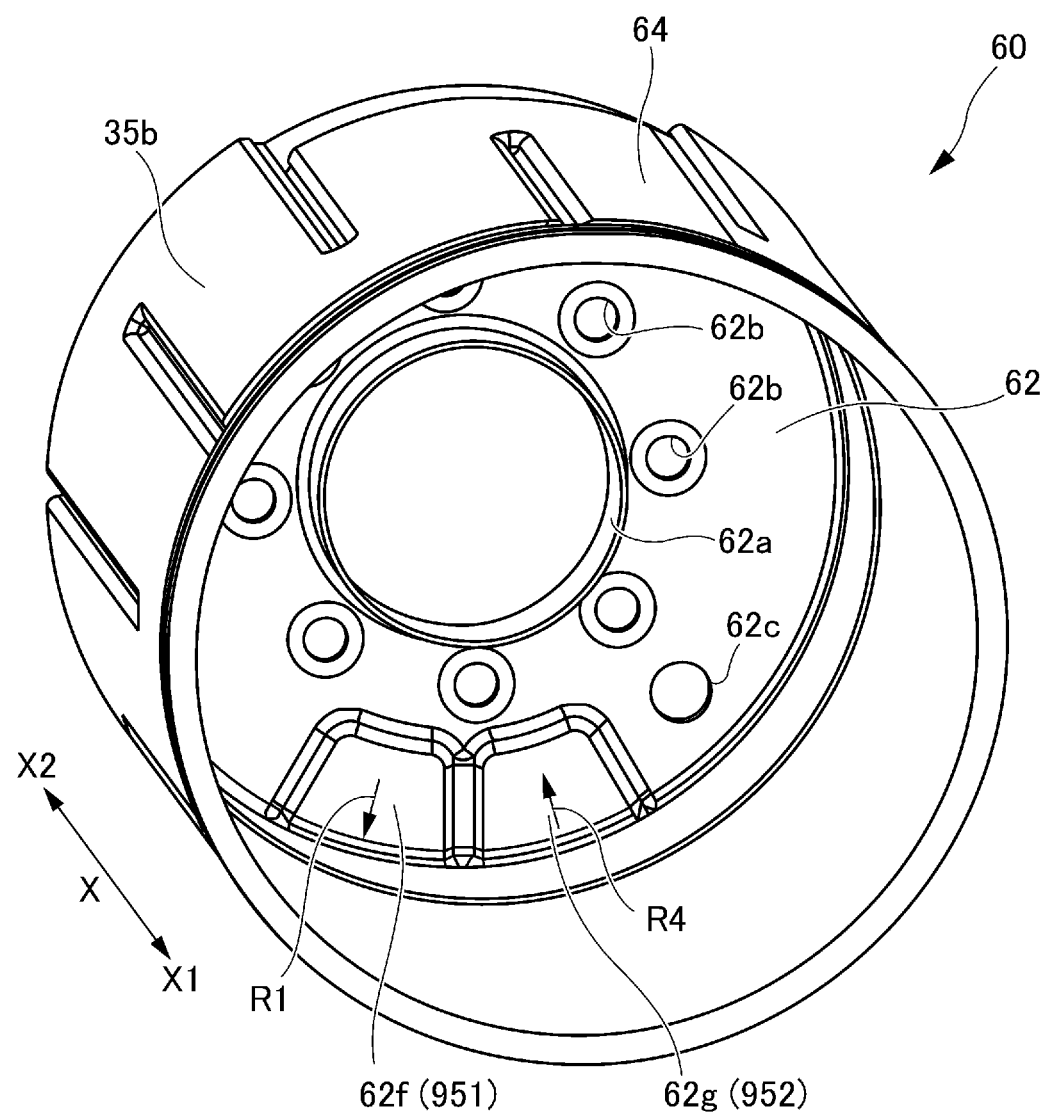
FIG. 6 is a perspective view of the retaining ring as viewed from an X1 side in the X direction (see FIG. 4).
Figure 7:
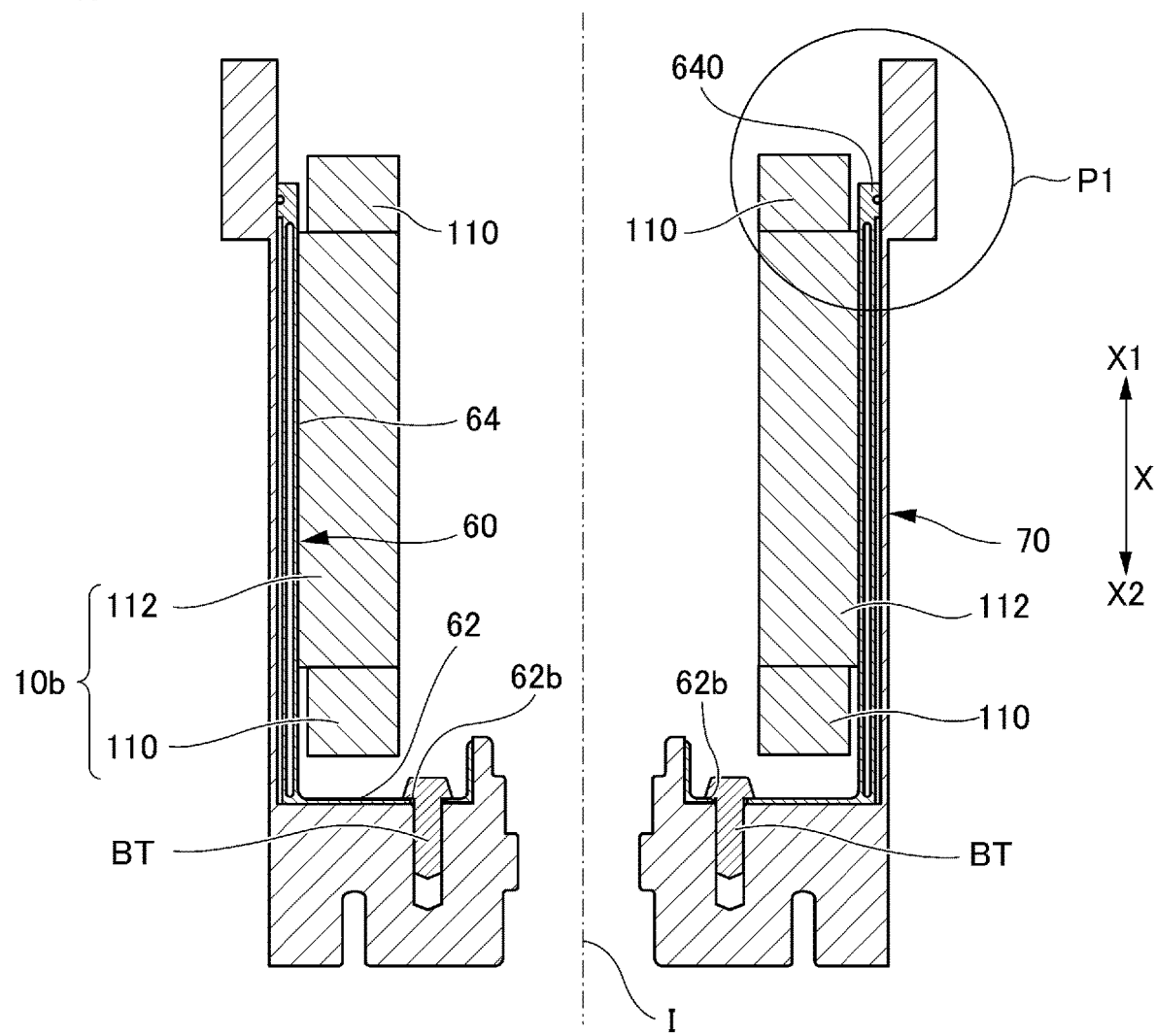
FIG. 7 is a cross-sectional view of a part of the motor shown in FIG. 3.
Figure 8:
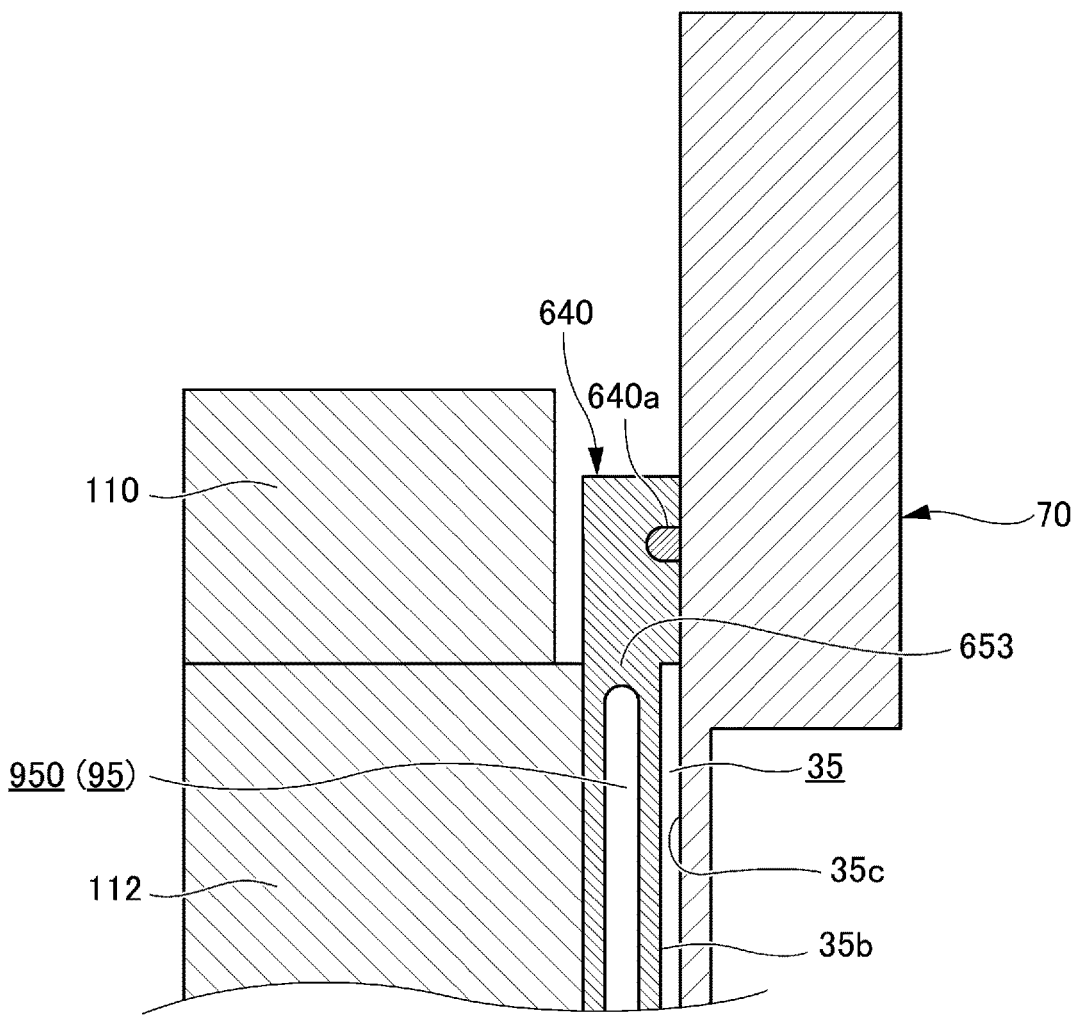
FIG. 8 is an enlarged view of a P1 portion of FIG. 7.

FIG. 3 is a perspective view showing the external appearance of a part of the motor 10. FIG. 4 is a perspective view of a retaining ring 60 (an example of a cooling water passage forming member) viewed in the same direction as FIG. 3. FIG. 5 is a perspective view of the retaining ring 60 viewed from an X2 side in an X direction (see FIG. 4). FIG. 6 is an explanatory view of the inside of the retaining ring 60, and is a perspective view of the retaining ring 60 viewed from an X1 side in the X direction (see FIG. 4). FIG. 7 is a cross-sectional view of a part of the motor 10 shown in FIG. 3. FIG. 8 is an enlarged view of a portion P1 in FIG. 7. In FIG. 3, illustration of the rotor of the motor 10 and the like is omitted.

In the following, the radial direction is based on a central axis I of the motor 10 (that is the central axis of the stator core 112) unless otherwise specified. The axial direction of the motor 10 corresponds to the X direction. Further, in the following description, an up-down direction represents the up-down direction in the mounted state of the motor 10 that is mounted such that the central axis I is substantially parallel to a horizontal direction. The cross-section of FIG. 7 is a cross-section taken along a plane passing through the central axis I.

The heat exchange/water cooling portion 50 includes the retaining ring 60 and the case 70. The heat exchange/water cooling portion 50 forms the oil passage 35 (see FIG. 2) between the retaining ring 60 and the case 70 in the radial direction. Hereinafter, the "oil passage 35" will be referred to as a "case oil passage 35", and the structure of the case oil passage 35 will be described later. Further, the heat exchange/water cooling portion 50 includes the cooling water passage 95 (see FIG. 2) inside the retaining ring 60. The structure of the cooling water passage 95 will be described later.

The retaining ring 60 has a cylindrical shape as shown in FIGS. 4 to 6. The retaining ring 60 is formed of a material having good thermal conductivity such as metal. The retaining ring 60 has a structure having a hollow portion (cavity) that forms the cooling water passage 95 (see FIG. 2) as described later. The retaining ring 60 having such a hollow portion may be manufactured by combining a plurality of parts, or may be formed by casting.

As shown in FIGS. 4 to 6, the retaining ring 60 includes an annular bottom surface portion 62 (an example of a second part), and a cylindrical portion 64 (an example of the first part) extending from an outer peripheral edge of the bottom surface portion 62 in the X direction. The bottom surface portion 62 and the cylindrical portion 64 may form an integral continuous part.

In the bottom surface portion 62, the retaining ring 60 has a hole 62a through which a rotor (not shown) passes. The hole 62a is formed, for example, in a circular shape with the center of the bottom surface portion 62 (center through which the central axis I passes) as the center.

As shown in FIGS. 5 and 7, the retaining ring 60 further has a through hole 62b in the bottom surface portion 62. The through hole 62b is used to fix the retaining ring 60 to the case 70 with bolts. The through hole 62b is formed with such a diameter that a shaft portion of a bolt BT (see FIG. 7) passes through the through hole 62b. A plurality of the through holes 62b is provided along a circumferential direction.

At this time, the through holes 62b are formed at equal intervals along the circumferential direction. The through holes 62b are preferably positioned within a range in a radial direction so as not to overlap the stator core 112 when viewed in the X direction, as shown in FIG. 7. As a result, workability when assembling the retaining ring 60 to the case 70 when the stator core 112 is assembled to the retaining ring 60 is improved. That is, workability is improved since a work space for fastening the bolt BT is formed on an outer peripheral side of the stator core 112.

As shown in FIG. 5, the retaining ring 60 further has an oil outlet hole 62c in a form of a through hole in the bottom surface portion 62. The oil outlet hole 62c is an outlet hole for oil accumulated in a lower portion (oil sump space) of the motor 10 and is connected to the tank 30 (see FIG. 2). The oil outlet hole 62c is preferably positioned below the central axis I and within a radial range overlapping the stator core 112 when viewed in the X direction, as shown in FIG. 6. In this case, the oil outlet hole 62c can be disposed at a position that does not restrict the formation of the through holes 62b. The oil outlet hole 62c determines the highest position of the oil accumulated in the oil sump space, and is set so that the highest position of the oil is lower than the lowest position of the rotor 10a. That is, the oil outlet hole 62c may be formed so that a lower end is positioned at a height that is approximately the difference between the inner and outer diameters of the stator core 112.

As shown in FIG. 5, the retaining ring 60 further includes a cooling water inlet portion 62d and a cooling water outlet portion 62e on the X2 side in the X direction of the bottom surface portion 62. The cooling water inlet portion 62d and the cooling water outlet portion 62e are in communication with an inlet water passage 951 and an outlet water passage 952 (both described later) formed in the bottom surface portion 62, from the X2 side in the X direction of the bottom surface portion 62.

The cooling water inlet portion 62d and the cooling water outlet portion 62e are provided at substantially the same position in the radial direction and are provided circumferentially adjacent to each other, as shown in FIG. 5, for example. In the present embodiment, as an example, the cooling water inlet portion 62d and the cooling water outlet portion 62e are provided so as to be positioned on both sides of a recessed groove 641, which is described later, in the circumferential direction. In this case, since the recessed groove 641 is close to the cooling water inlet portion 62d, the oil (described later) introduced into the recessed groove 641 in the X direction can be efficiently cooled by the cooling water introduced into the cooling water inlet portion 62d.

As shown in FIG. 6, the retaining ring 60 has bulging portions 62f and 62g that form the inlet water passage 951 and the outlet water passage 952 (both of which will be described later) inside the bottom surface portion 62 on the X1 side in the X direction. The bulging portions 62f and 62g are provided on the opposite sides of the cooling water inlet portion 62d and the cooling water outlet portion 62e respectively, in the X direction.

In the retaining ring 60, the entire outer radial surface (outer peripheral surface) of the cylindrical portion 64, excluding an end portion 640 on the X1 side in the X direction of the cylindrical portion 64, forms a boundary surface 35b on the inner radial side of the case oil passage 35 (see FIG. 2). In addition, as shown in FIG. 8, the end portion 640 of the cylindrical portion 64 has an outer diameter that is larger than that of the boundary surface 35b on the inner radial side of the case oil passage 35 (see FIG. 2) in order to secure a necessary dimension of the case oil passage 35 in the radial direction.

As shown in FIGS. 5 and 8, the retaining ring 60 has a seal groove 640a that is recessed radially inward on an outer peripheral surface of the end portion 640 of the cylindrical portion 64. The seal groove 640a extends over the entire circumference in the circumferential direction. The outer peripheral surface of the end portion 640 of the cylindrical portion 64 is in contact with an inner peripheral surface of the case 70 in the radial direction over the entire circumference in the circumferential direction. A seal material (not shown) such as an O-ring is installed in the seal groove 640a. As a result, the space between the case 70 and the retaining ring 60 (the case oil passage 35) on the X1 side in the X direction of the cylindrical portion 64 is kept oil-tight.

The retaining ring 60 retains the stator core 112 radially inward in such a manner that the cylindrical portion 64 is in contact with the stator core 112 in the radial direction. That is, the retaining ring 60 retains the stator core 112 in such a manner that an inner peripheral surface of the cylindrical portion 64 is in contact with an outer peripheral surface of the stator core 112. For example, the retaining ring 60 is integrated with the stator core 112 by shrink fitting. The retaining ring 60 is bolted to the case 70 while being integrated with the stator core 112. In this way, the retaining ring 60 supports the stator 10b including the stator core 112, with respect to the case 70.

The retaining ring 60 preferably retains the stator core 112 in such a manner that the inner peripheral surface of the cylindrical portion 64 is in contact with substantially the entire outer peripheral surface of the stator core 112. In this case, the entire stator core 112 can be efficiently cooled by the cooling water passing through the cooling water passage 95 in the retaining ring 60. In the present embodiment, as an example, the retaining ring 60 extends over the entire length of the stator core 112 in the X direction as shown in FIG. 7, and the inner peripheral surface of the cylindrical portion 64 is in contact with substantially the entirety of the outer peripheral surface of the stator core 112. The "substantially the entirety" of the outer peripheral surface of the stator core 112 is a concept in which a portion (a portion in which the outer peripheral surface of the stator core 112 and the inner peripheral surface of the cylindrical portion 64 are separated from each other in the radial direction) such as a welding groove (not shown) of the stator core 112 is allowed.

Further, in the retaining ring 60, as shown in FIG. 7, the cylindrical portion 64 extends beyond the coil end 110 in the X direction on the X2 side in the X direction. In contrast, in the present embodiment, as an example, on the X1 side in the X direction of the retaining ring 60, the cylindrical portion 64 extends to a position short of the end portion of the coil end 110 (the end portion on the X1 side) in the X direction, as shown in FIG. 7. However, in a modification, also on the X1 side in the X direction of the retaining ring 60, the cylindrical portion 64 may extend in the X direction to the end portion (the end portion on the X1 side) of the coil end 110 or beyond the end portion.

As shown in FIG. 7, on the X2 side in the X direction of the retaining ring 60, the bottom surface portion 62 faces, in the X direction, the end surface of the stator core 112 on the X2 side in the X direction. At this time, in the present embodiment, in the retaining ring 60, the bottom surface portion 62 faces and is separated from the end portion of the stator 10b on the X2 side in the X direction (the end surface of the coil end 110 on the X2 side in the X direction) in the X direction, as an example. At this time, the separated distance may correspond to a required insulation distance between the coil end 110 and the retaining ring 60.

As shown in FIG. 4, the retaining ring 60 has recessed grooves 641, 642, 643 that are recessed radially inward, on the outer peripheral surface of the cylindrical portion 64. The recessed grooves 641, 642, 643 function as recessed oil passages 351, 352, 353 (described later) that form a part of the case oil passage 35 (see FIG. 2), and function as a partition wall (side wall) of a meandering water passage 950 (see FIG. 11), described later, in the circumferential direction.

The recessed groove 641 extends linearly in the X direction in such a manner that the X2 side in the X direction is opened in the X direction and the X1 side in the X direction is closed in the X direction. The recessed groove 641 extends to the end portion 640 of the cylindrical portion 64 on the X1 side in the X direction. The recessed groove 641 is formed so as to be positioned below the recessed grooves 642 and 643 (see also FIG. 11, which will be described later). That is, when the motor 10 is mounted, the recessed groove 641 is positioned in a lowermost region of the retaining ring 60. The lowermost region of the retaining ring 60 represents the lowest position of the retaining ring 60 and the region in the vicinity thereof. The lowermost region may be, for example, a range of about 60 degrees in the circumferential direction with the circumferential position corresponding to the lowest position as the center. The recessed groove 641 forms an oil inlet portion 35a, which will be described later, of the case oil passage 35 (the oil inlet to the case oil passage 35) on the X2 side in the X direction. The recessed groove 641 extends in the X direction with a substantially uniform cross-section, for example. The recessed groove 641 may have a cross-sectional shape that is slightly enlarged from a predetermined position in the X direction toward the X2 side in the X direction in order to ensure a cross-sectional area serving as the oil inlet portion 35a.

The recessed groove 642 extends linearly in the X direction in such a manner that the X2 side in the X direction is opened in the X direction and the X1 side in the X direction is closed in the X direction. The X1 side in the X direction of the recessed groove 642 extends to a position that is a predetermined distance L1 (see FIG. 4) short of the end portion 640 of the cylindrical portion 64. The recessed groove 642 extends in the X direction with a substantially uniform cross-section, for example. The predetermined distance L1 is a value that determines a flow passage width of the meandering water passage 950 (see FIG. 11) described later, and may be determined from the viewpoint of enhancing the heat exchange capacity with the flow of the cooling water (see arrows R2 and R3 in FIG. 5) in the meandering water passage 950 (see FIG. 11).

The recessed groove 643 extends linearly in the X direction in such a manner that the X1 side and the X2 side in the X direction are closed in the X direction. The X1 side in the X direction of the recessed groove 643 extends to the end portion 640 of the cylindrical portion 64. The X2 side in the X direction of the recessed groove 643 extends to a position that is a predetermined distance L2 (see FIG. 4) short of the end portion (the end portion on the X2 side) of the cylindrical portion 64. The recessed groove 643 extends in the X direction with a substantially uniform cross-section, for example. The predetermined distance L2 may be the same as the predetermined distance L1.

The recessed groove 642 and the recessed groove 643 are alternately formed in the circumferential direction, as shown in FIG. 4. That is, the recessed groove 642 and the recessed groove 643 are formed over the entirety in the circumferential direction such that, with the recessed groove 641 in the lowermost region as the center, the recessed grooves 642 are formed on the outer sides of the recessed groove 641 in the circumferential direction, the recessed groove 643 is formed on each outer side of the recessed groove 642 in the circumferential direction, and the recessed groove 642 is formed on the outer side of each recessed groove 643 in the circumferential direction. However, as described later, the recessed groove 642 and the recessed groove 643 formed in a zenith region are integrated with oil dropping portions 356 and 358 for dropping oil onto the coil end 110.

The recessed grooves 641, 642, 643 are formed along the circumferential direction of the cylindrical portion 64 at predetermined angular intervals (30 degree intervals in the present example). In the present embodiment, as an example, the recessed grooves 642 are formed at intervals of 60 degrees with a deviation of 30 degrees from the recessed groove 641 in the lowermost region, and the recessed grooves 643 are formed at 60 degree intervals with a deviation of 60 degrees from the recessed groove 641 in the lowermost region.

The case 70 is formed of metal such as aluminum. The case 70 may be formed by combining two or more parts. The case 70 supports the retaining ring 60 radially inward. That is, the case 70 is provided so as to cover the outer radial side of the cylindrical portion 64 of the retaining ring 60, and supports the retaining ring 60. Although the supporting manner of the retaining ring 60 is arbitrary, it is preferable that the case 70 support the retaining ring 60 with bolts BT (an example of a fixing member) passing through the through hole 62b of the bottom surface portion 62 of the retaining ring 60, as shown in FIG. 7. That is, the retaining ring 60 is fixed to the case 70 by the bolt BT. Thereby, it becomes easier to reduce the diameter of the motor 10 as compared with a case in which the retaining ring 60 includes a mounting portion (a part for being fixed to the case by bolts) that projects radially outward, for example.

The case 70 forms the case oil passage 35 (see FIGS. 2 and 8) between the case 70 and the retaining ring 60 in the radial direction. The inner peripheral surface (the inner surface in the radial direction) of the case 70 faces the outer peripheral surface of the cylindrical portion 64 of the retaining ring 60 in the radial direction. The inner peripheral surface of the case 70 is a surface without recesses and protrusions, and forms a boundary surface 35c on the outer radial side of the case oil passage 35 (see FIGS. 2 and 8), for example.

Next, the cooling water passage 95 (see FIG. 2) formed by the retaining ring 60 will be described in detail with reference to FIGS. 9 to 13.

The cooling water passage 95 is connected to case water passages 942 and 944. Specifically, in the cooling water passage 95, an upstream end portion connected to the case water passage 942 and a downstream end portion connected to the case water passage 944.

Figure 9:
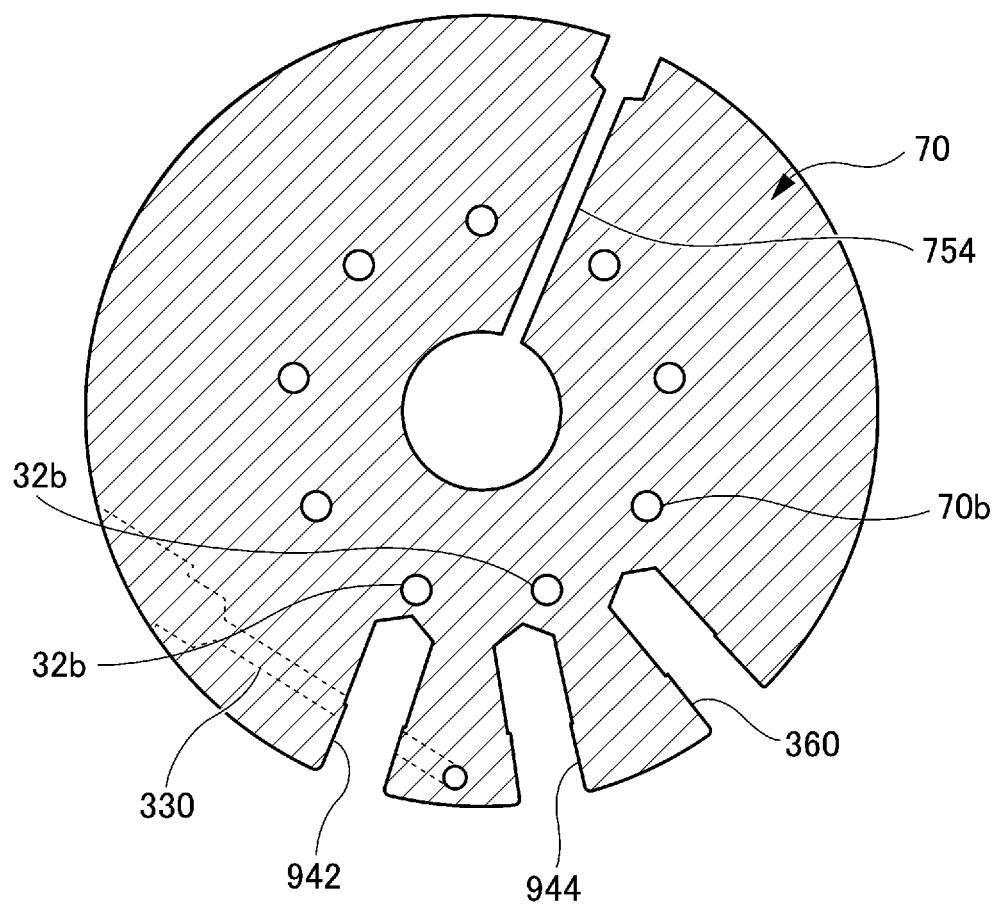
FIG. 9 is an explanatory diagram of a case water passage.

FIG. 9 is an explanatory view of the case water passages 942 and 944 in the case 70, and is a cross-sectional view of the end portion on the X2 side in the X direction of the motor 10 taken along a plane perpendicular to the central axis I. In FIG. 9, an inlet oil passage 330 extending up to the oil inlet portion 35a of the case oil passage 35 is also shown. The inlet oil passage 330 forms the oil passage 33 (see FIG. 2). Further, FIG. 9 also shows an outlet oil passage 360 connected to the oil outlet hole 62c. The outlet oil passage 360 forms the oil passage 36 (see FIG. 2). Further, FIG. 9 also shows an oil passage 754 to which lubricating oil for a bearing, etc. is supplied.

The case water passages 942 and 944 are formed in the case 70 and extend radially inward from the outer peripheral surface of the case 70 to a position short of the bolt hole 70b for the bolt BT. The case water passages 942 and 944 extend in the X direction from the vicinity of the end portion on the inner radial side toward the X1 side in the X direction (see FIG. 13 for the case water passage 942). The case water passage 942 is a flow passage connected to the discharge side of the water pump 90, and the case water passage 944 is a flow passage connected to the suction side of the water pump 90. The case water passages 942 and 944 are respectively connected to the inlet water passage 951 and the outlet water passage 952 at the end portion on the X1 side in the X direction.

The cooling water passage 95 includes the meandering water passage 950 (an example of a first cooling water passage), the inlet water passage 951 (an example of a second cooling water passage), and the outlet water passage 952.

Figure 10:
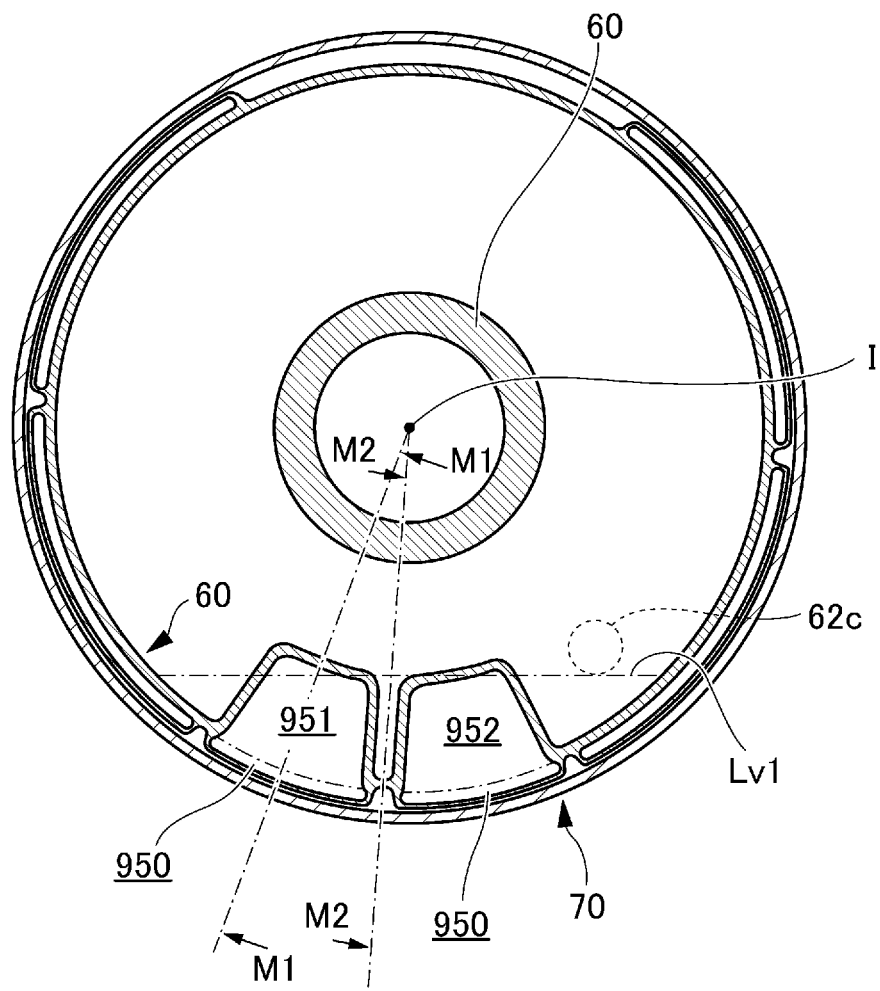
FIG. 10 is an explanatory diagram of an inlet water passage and an outlet water passage.

FIG. 10 is an explanatory diagram of the inlet water passage 951 and the outlet water passage 952, and is a cross-sectional view of an end portion of the motor 10 on the X2 side in the X direction (the X1 side of the cross-section shown in FIG. 9) that is cut by a plane perpendicular to the central axis I. In FIG. 10, the oil outlet hole 62c is shown by a long dashed short dashed line to show the position of the oil outlet hole 62c, and as a reference, the highest position (level) of the oil accumulated in the oil sump space is shown by the line Lv1.

The inlet water passage 951 and the outlet water passage 952 are formed by a hollow portion (cavity) in the bottom surface portion 62 of the retaining ring 60. The inlet water passage 951 and the outlet water passage 952 are provided corresponding to each of the cooling water inlet portion 62d and the cooling water outlet portion 62e (see FIG. 5), respectively. The inlet water passage 951 and the outlet water passage 952 each extend in the radial direction and the circumferential direction. That is, the inlet water passage 951 extends in the radial direction and the circumferential direction in the bottom surface portion 62 of the retaining ring 60 in a manner in which the inlet water passage 951 is continuous with the cooling water inlet portion 62d in the X direction. The outlet water passage 952 extends in the radial direction and the circumferential direction in the bottom surface portion 62 of the retaining ring 60 in a manner in which the outlet water passage 952 is continuous with the cooling water outlet portion 62e in the X direction. Each of the inlet water passage 951 and the outlet water passage 952 extends to the vicinity of the end portion on the outer radial side of the bottom surface portion 62, and continues to the meandering water passage 950 (described later).

It is preferable that the inlet water passage 951 and the outlet water passage 952 be formed so as to at least partially overlap with the oil sump space when viewed in the X direction, and it is more preferable that the inlet water passage 951 and the outlet water passage 952 be formed so that substantially the entirety overlaps with the oil sump space when viewed in the X direction, as shown in FIG. 10. For example, when viewed in the X direction, the inlet water passage 951 and the outlet water passage 952 are positioned below the central axis I of the stator core 112 and overlap with the stator core 112. In this case, heat exchange between the oil accumulated in the oil sump space and the cooling water in the inlet water passage 951 and the outlet water passage 952 is efficiently realized, and the oil accumulated in the oil sump space can be efficiently cooled. As described above, the oil sump space is a lower space in which the highest position (see the line Lv1 in FIG. 10) is defined by the oil outlet hole 62c, among the inner radial space formed by the retaining ring 60. In particular, the inlet water passage 951 is preferably formed so as to overlap with the oil sump space when viewed in the X direction. This is because the cooling water in the inlet water passage 951 has a lower temperature than the cooling water in the outlet water passage 952 and has a higher heat exchange capacity than the cooling water in the outlet water passage 952. Hereinafter, forming the inlet water passage 951 and the outlet water passage 952 so as to at least partially overlap with the oil sump space when viewed in the X direction is also referred to as "overlapping disposition with the oil sump space when viewed in the X direction".

The position of the cooling water inlet portion 62d (see FIG. 5) on the bottom surface portion 62, that is, a connection position between the inlet water passage 951 and the cooling water inlet portion 62d is preferably set so as to overlap with the oil sump space when viewed in the X direction. Similarly, the position of the cooling water outlet portion 62e on the bottom surface portion 62, that is, a connection position between the outlet water passage 952 and the cooling water outlet portion 62e is preferably set so as to overlap with the oil sump space when viewed in the X direction. As described above, the cooling water inlet portion 62d and the cooling water outlet portion 62e are provided at positions farther from the central axis I of the stator core 112 in the radial direction than the through holes 62b into which the bolts BT is inserted. In this case, in the bottom surface portion 62, the through holes 62b, the cooling water inlet portion 62d, the cooling water outlet portion 62e, and the oil outlet hole 62c are disposed appropriately from three viewpoints: a viewpoint of ensuring workability for fastening the bolts BT; a viewpoint of realizing the overlapping disposition with the oil sump space in the X direction; and forming an oil sump space in which the highest position is lower than the rotor 10a. Further, the bottom surface portion 62 can be efficiently used to form the through holes 62b, the cooling water inlet portion 62d, the cooling water outlet portion 62e, and the oil outlet hole 62c. For example, in the three component relationship among the cooling water inlet portion 62d, the cooling water outlet portion 62e, and the oil outlet hole 62c, the cooling water inlet portion 62d and the cooling water outlet portion 62e are disposed so as to overlap with the oil sump space when viewed in the X direction, and the oil outlet hole 62c is positioned in a manner in which the oil outlet hole 62c is above the cooling water outlet portion 62e and adjacent to the cooling water outlet portion 62e so as to appropriately restrict the highest position of the oil sump space, as shown in FIG. 5. In a modification, the oil outlet hole 62c may be provided in a manner in which the oil outlet hole 62c is above the cooling water inlet portion 62d and adjacent to the cooling water inlet portion 62d in the circumferential direction.

Figure 11:
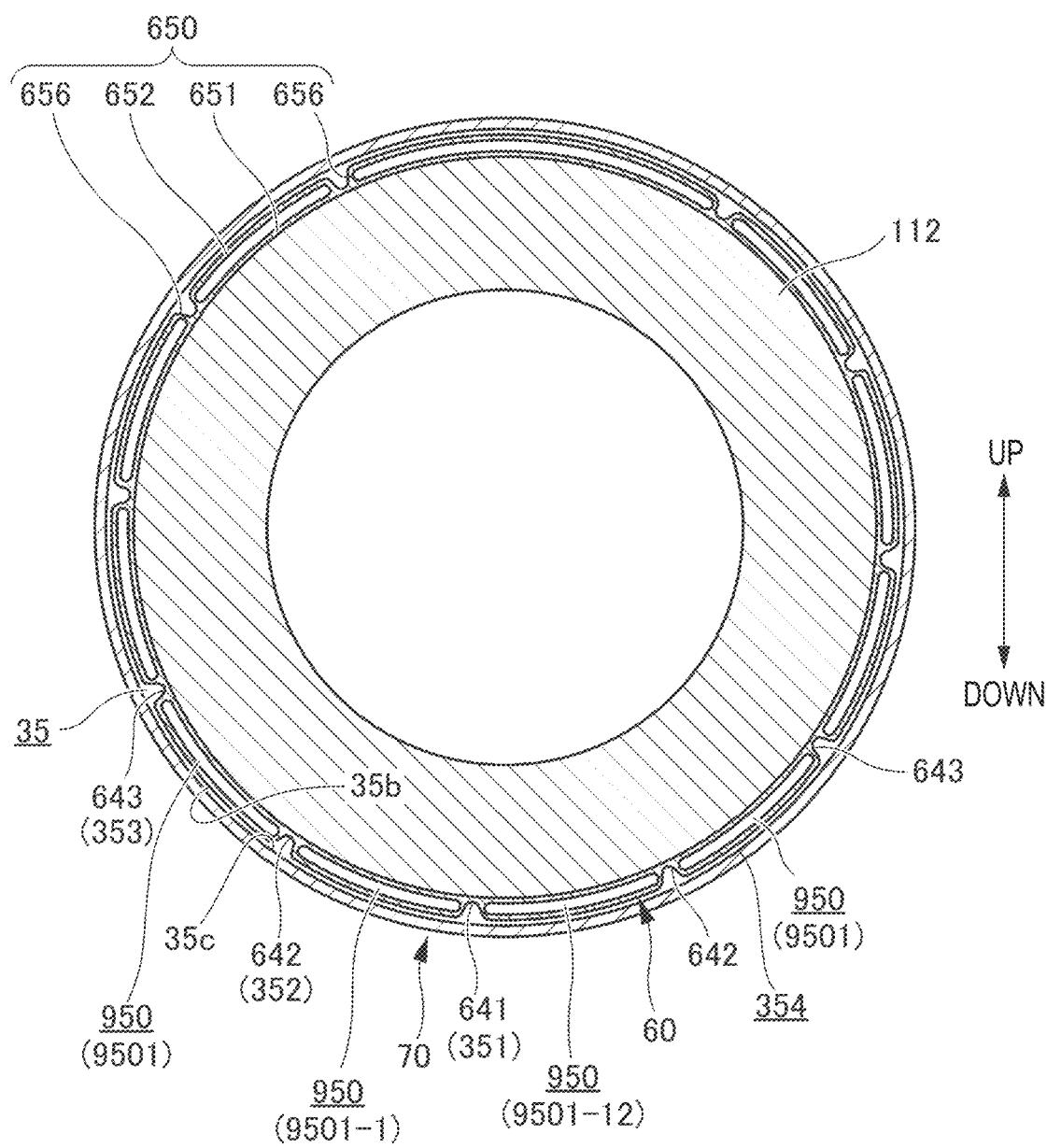
FIG. 11 is an explanatory diagram of a meandering water passage.
Figure 12:
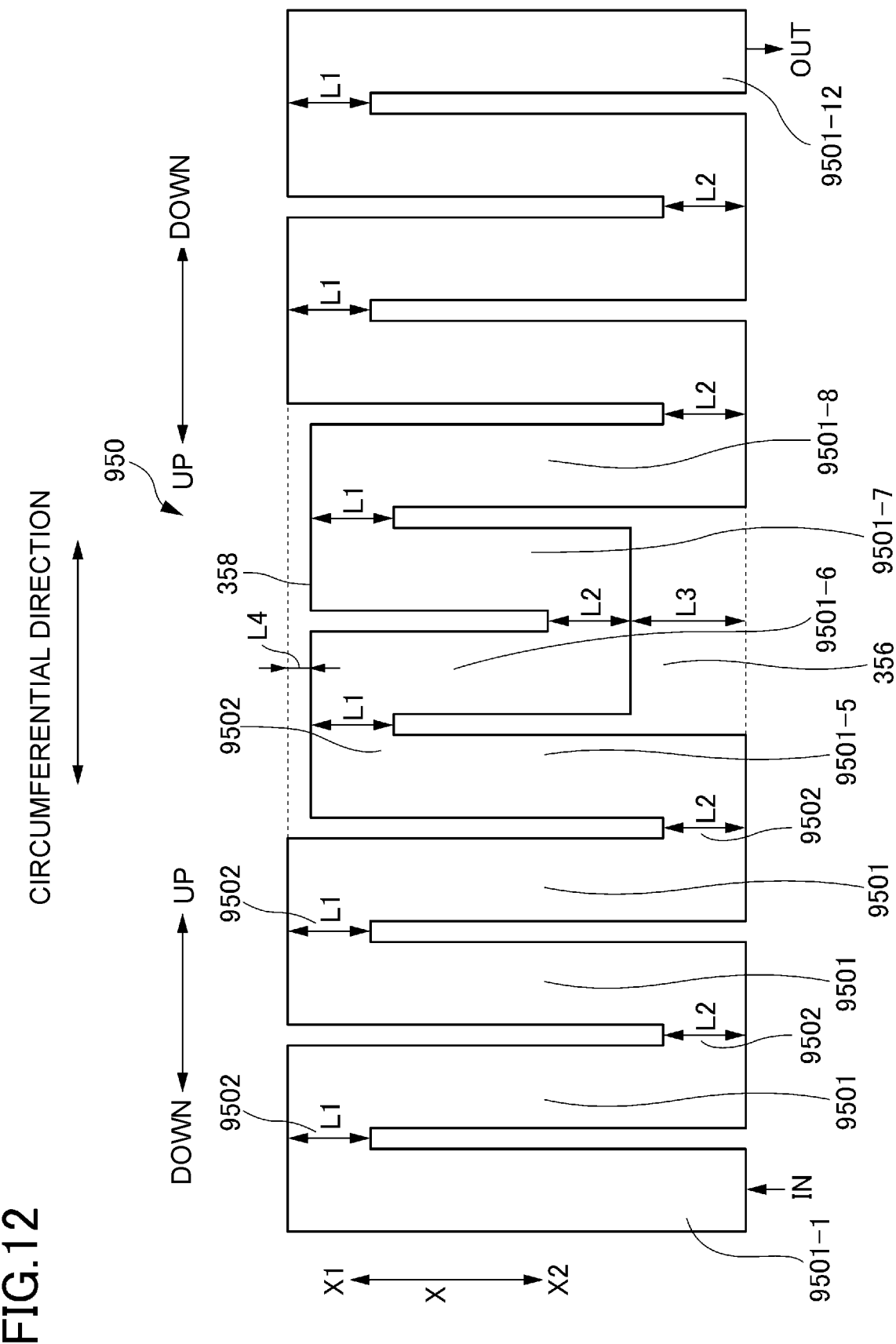
FIG. 12 is a diagram schematically showing a developed state of the meandering water passage.

FIG. 11 is an explanatory diagram of the meandering water passage 950, and is a cross-sectional view of the end portion of the motor 10 on the X2 side in the X direction (near the X1 side than the cross-section shown in FIG. 10) that is cut by a plane perpendicular to the central axis I. FIG. 12 is a diagram schematically showing a developed state of the meandering water passage 950. That is, FIG. 12 is a diagram schematically showing the state of the meandering water passage 950 when the cylindrical shape of the retaining ring 60 is developed into a planar shape.

Figure 17:
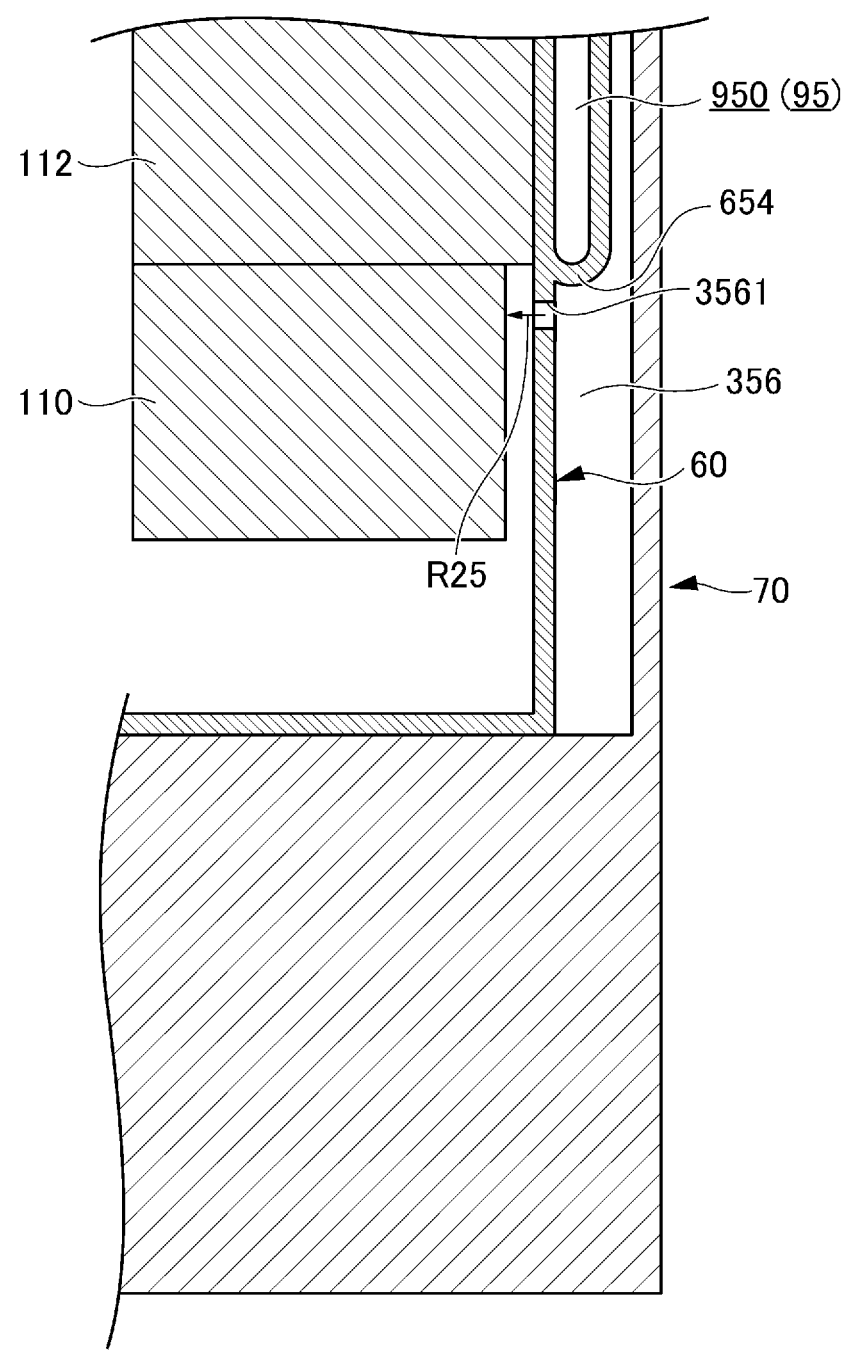
FIG. 17 is a cross-sectional view of the oil dropping hole passing through the oil dropping portion.
Figure 18:
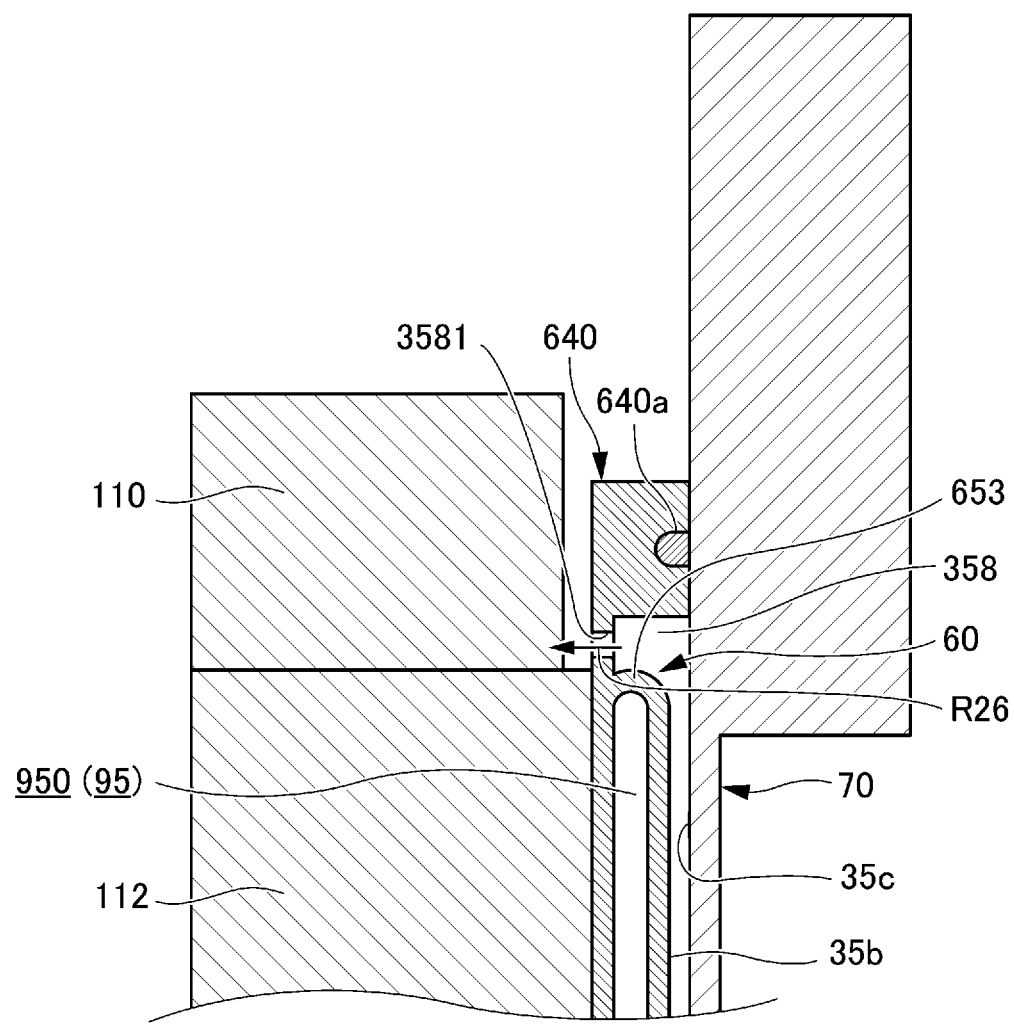
FIG. 18 is a cross-sectional view of the oil dropping hole passing through the oil dropping portion.

The meandering water passage 950 is formed by a hollow portion (cavity) in the cylindrical portion 64 of the retaining ring 60. That is, the meandering water passage 950 is formed by the space defined by a wall surface portion 650 of the retaining ring 60. The wall surface portion 650 includes an inner radial side wall surface portion 651 (an example of a first wall surface portion) that is in contact with the stator core 112, an outer radial side wall surface part 652 (an example of a second wall surface portion) that is in contact with the case oil passage 35, an end portion wall surface portion 653 (see FIGS. 8 and 18) of the end portion on the X1 side in the X direction, end portion wall surface portion 654 (see FIG. 17) of the end portion on the X2 side in the X direction, and a wall surface portion 656 in the circumferential direction. The wall surface portion 656 also forms a side wall portion of the recessed oil passages 351, 352, 353 described later.

The meandering water passage 950 is formed in the cylindrical portion 64 of the retaining ring 60 so as to travel back and forth in the X direction. That is, the meandering water passage 950 extends from the X2 side in the X direction to the X1 side in the X direction of the retaining ring 60, then folds back to extend from the X1 side in the X direction to the X2 side in the X direction, and then folds back to extends from the X2 side in the X direction to the X1 side in the X direction. In this way, the meandering water passage 950 is formed in such a manner in which the meandering water passage 950 travels in the circumferential direction while meandering. At this time, the meandering water passage 950 is formed so as to travel back and forth over the entire stator core 112 in the X direction so that the cooling water flowing through the meandering water passage 950 can remove heat from the entire stator core 112. In the present embodiment, as an example, the meandering water passage 950 is formed so as to travel back and forth over the entire retaining ring 60 in the X direction, except for a formation range of oil dropping portions 356, 358 described later. In other words, the length of the retaining ring 60 in the X direction depends on the range in which the meandering water passage 950 is formed in the X direction.

More specifically, as shown in FIG. 12, the meandering water passage 950 includes a plurality of first flow passage portions 9501 extending in the X direction and a plurality of second flow passage portions 9502 extending in the circumferential direction. The meandering water passage 950 is formed in such a manner that the first flow passage portions 9501 (the twelve first flow passage portions 9501 in the example shown in FIG. 12) are connected via the second flow passage portions 9502. At this time, the second flow passage portions 9502 are alternately arranged on the X1 side and the X2 side along the circumferential direction, so that "meandering" is realized. That is, one second flow passage portion 9502 and two first flow passage portions 9501 connected to both sides (both sides in the circumferential direction) of the second flow passage portion 9502 form a U-shaped flow passage, and the direction of the flow passage is reversed in the X direction each time one second flow passage portion 9502 changes in the circumferential direction.

Among the first flow passage portions 9501, two first flow passage portions 9501-6 and 9501-7 above the others extend to a position short of a length L3 from the endmost portion on the X2 direction X2 side in the X direction of the retaining ring 60, in the X direction. The range of the length L3 at the end portion on the X2 side in the X direction of the retaining ring 60 corresponds to the formation range of the oil dropping portion 356 described later. In contrast, among the first flow passage portions 9501, the first flow passage portions 9501 other than the first flow passage portions 9501-6 and 9501-7 extend to a position just before an endmost portion on the X2 side in the X direction of the retaining ring 60 (for example, the maximum position at which a cavity can be formed), in the X direction. As a result, it is possible to maximize the area in which heat exchange between the cooling water and the oil can be realized.

Similarly, among the first flow passage portions 9501, four first flow passage portions 9501-5 to 9501-8 above the others extend to a position short of a length L4 from an endmost portion on the X1 side in the X direction of the retaining ring 60 (the endmost portion among the parts excluding the end portion 640 and the same applies hereinafter), in the X direction. The range of the length L4 at the end portion of the retaining ring 60 on the X1 side in the X direction corresponds to the formation range of the oil dropping portion 358 described later. In contrast, among the first flow passage portions 9501, the first flow passage portions 9501 other than the first flow passage portions 9501-5 to 9501-8 extend to a position just before the endmost portion on the X1 side in the X direction of the retaining ring 60 (for example, the maximum position at which a cavity can be formed), in the X direction. As a result, it is possible to maximize the area in which heat exchange between the cooling water and the oil can be realized.

Among the first flow passage portions 9501, two first flow passage portions 9501-1 and 9501-12 (see also FIG. 11) below the others correspond to the first flow passage portion 9501 that is closest to the cooling water inlet portion 62d and the first flow passage portion 9501 that is closest to the cooling water outlet portion 62e, respectively. That is, the recessed groove 641 (and also the recessed oil passage 351 to be described later) is positioned between the first flow passage portion 9501-1 and the first flow passage portion 9501-12 in the circumferential direction. This facilitates the above-described overlap disposition of the inlet water passage 951 and the outlet water passage 952 with the oil sump space when viewed in the X direction. Note that the first flow passage portion 9501-1 and the first flow passage portion 9501-12 are different from the other first flow passage portions 9501 and are connected to the second flow passage portion 9502 at only one end side (in the present example, the end portion on the X1 side in the X direction).

In the present embodiment, the U-shaped flow passage in the meandering water passage 950 is formed in a U-shape (rectangular U-shape) with a relatively small corner radius. However, the U-shaped flow passage may be formed in a U shape with a relatively large corner radius such that the second flow passage portion 9502 has a curved shape. In addition, in a modification, the first flow passage portion 9501 may be formed in a manner in which the first flow passage portion 9501 extends in a direction slightly inclined with respect to the X direction.

Next, the flow of the cooling water in the cooling water passage 95 will be outlined with reference to FIGS. 5 to 8 described above and FIG. 13.

Figure 13:
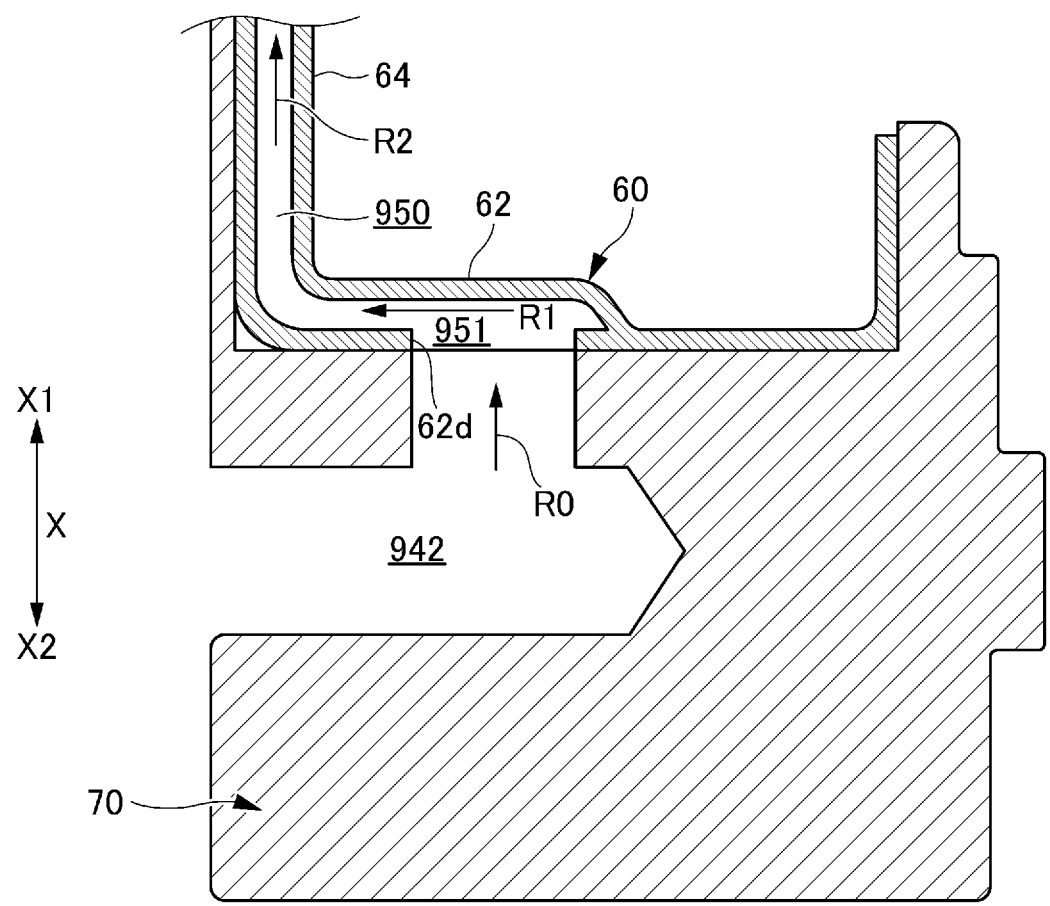
FIG. 13 is a cross-sectional view showing a relationship between a cooling water inlet portion and the inlet water passage.

FIG. 13 is a cross-sectional view showing a relationship between the cooling water inlet portion 62d and the inlet water passage 951. FIG. 13 is a cross-sectional view of a part of the motor 10 viewed in the direction indicated by an arrow M1 in FIG. 10, and is a cross-sectional view of the motor 10 in FIG. 3 in which a part of the motor 10 is cut along a plane passing through the central axis I. FIG. 13 shows the case water passage 942 formed in the case 70. The case water passage 942 is connected to one end of the inlet water passage 951 via the cooling water inlet portion 62d.

The other end of the inlet water passage 951 is connected to the meandering water passage 950. Although not shown, the same applies to the cooling water outlet portion 62e and the outlet water passage 952 side.

FIGS. 5, 6, and 13 schematically show the flow of the cooling water in the cooling water passage 95 with arrows R0 to R5 of long dashed short dashed lines.

As shown in FIGS. 5 and 13, when the cooling water is introduced into the retaining ring 60 from the cooling water inlet portion 62d (see the arrow R0 in FIGS. 5 and 13), the cooling water flows inside the inlet water passage 951 to the outer radial side (see arrow R1 in FIGS. 6 and 13), the flow direction is changed by 90 degrees (toward the X direction) at a corner portion (a corner portion formed by the bottom surface portion 62 and the cylindrical portion 64) of the retaining ring 60, and the cooling water is introduced into the meandering water passage 950 in the cylindrical portion 64. Next, the cooling water introduced into the meandering water passage 950 of the cylindrical portion 64 flows in the circumferential direction in a direction away from the recessed groove 641 (see arrow R2 in FIGS. 5 and 13) while flowing back and forth in the X direction. Then, when the cooling water passes a half circumference in the circumferential direction, the cooling water flows in the circumferential direction toward the recessed groove 641 (see arrow R3 in FIG. 5) while flowing back and forth in the X direction. Next, the flow direction is changed by 90 degrees (toward the direction parallel to the radial direction) at the corner portion of the retaining ring 60 (the corner portion formed by the bottom surface portion 62 and the cylindrical portion 64), and the cooling water is introduced into the outlet water passage 952 inside the bottom surface portion 62. Next, the cooling water introduced into the bottom surface portion 62 flows radially inward (see arrow R4 in FIG. 6) and flows from the cooling water outlet portion 62e to the case water passage 944 (see FIG. 9) of the case 70 (see the arrow R5 in FIG. 5).

In this way, the cooling water can efficiently remove heat from the oil through the boundary surface 35b while meandering through the meandering water passage 950 of the cooling water passage 95. Further, the cooling water can take heat from the stator core 112 while meandering through the meandering water passage 950 of the cooling water passage 95. That is, heat from the stator core 112 can be efficiently taken by the cooling water flowing in the retaining ring 60 that is in contact with the outer peripheral surface of the stator core 112. In addition, heat can be efficiently taken from the oil in the oil sump space by the cooling water flowing through the inlet water passage 951. Further, since the cooling water flowing through the outlet water passage 952 has a lower temperature than the oil in the oil sump space, heat can be taken from the oil in the oil sump space.

Figure 14:
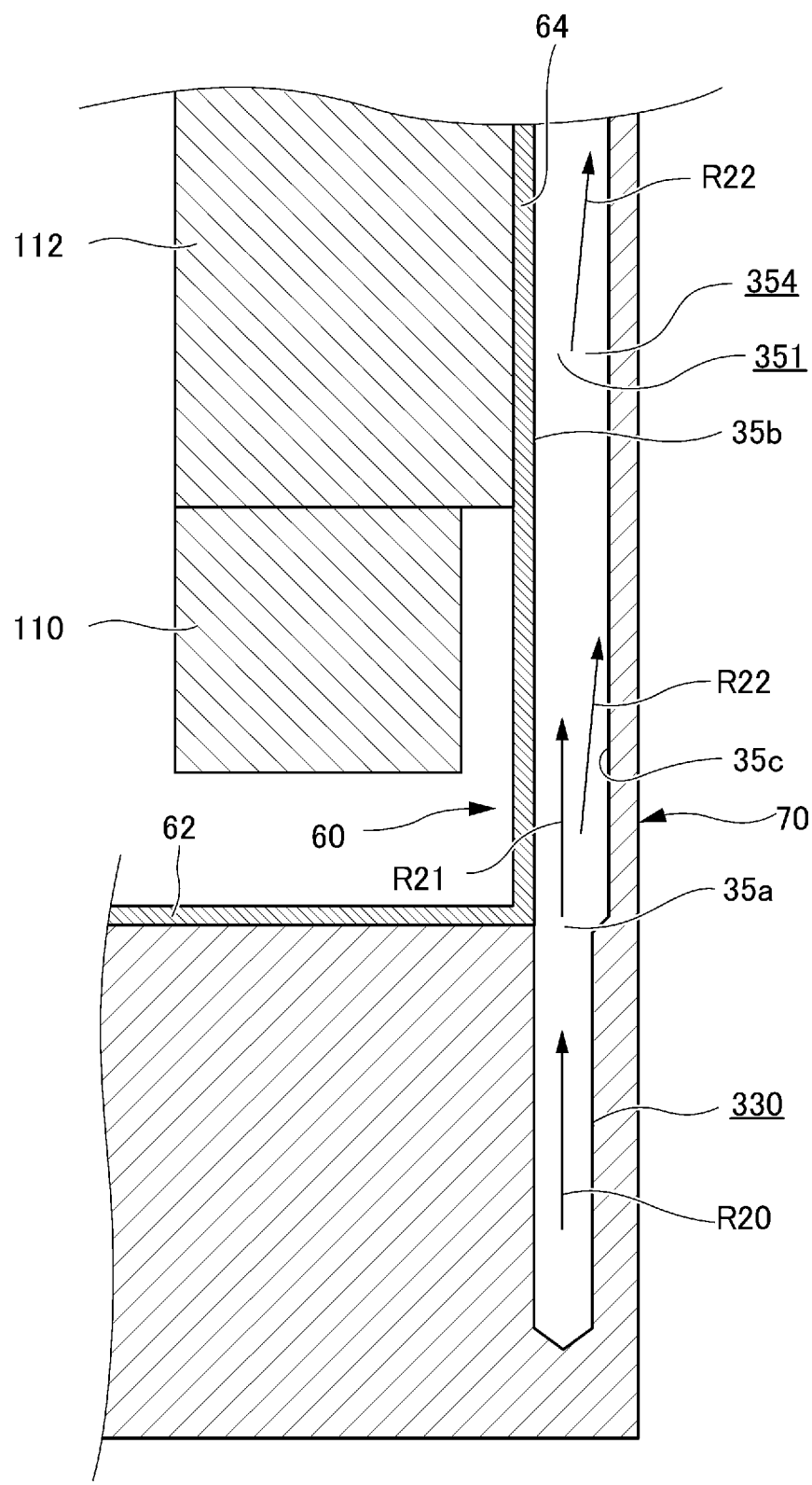
FIG. 14 is a cross-sectional view of a part of the motor viewed in a direction indicated by an arrow M2 in FIG. 10.

Next, referring to FIGS. 11 and 14 to explain the case oil passage 35 in detail.

FIG. 14 is a cross-sectional view of a part of the motor 10 viewed in the direction indicated by an arrow M2 in FIG. 10, and is a cross-sectional view of the motor 10 of FIG. 3 in which a part of the motor 10 is cut along a plane passing through the central axis I.

The upstream end portion of the case oil passage 35 is connected to the inlet oil passage 330. The inlet oil passage 330 is formed inside the case 70 as shown in FIGS. 9 and 14. The inlet oil passage 330 is formed in a region of the case 70 that does not overlap with the retaining ring 60 in the X direction.

The upstream end portion of the case oil passage 35 is connected to the inlet oil passage 330. The inlet oil passage 330 is formed inside the case 70 as shown in FIGS. 9 and 14. The inlet oil passage 330 is formed in a region of the case 70 that does not overlap with the retaining ring 60 in the X direction.

Figure 15:
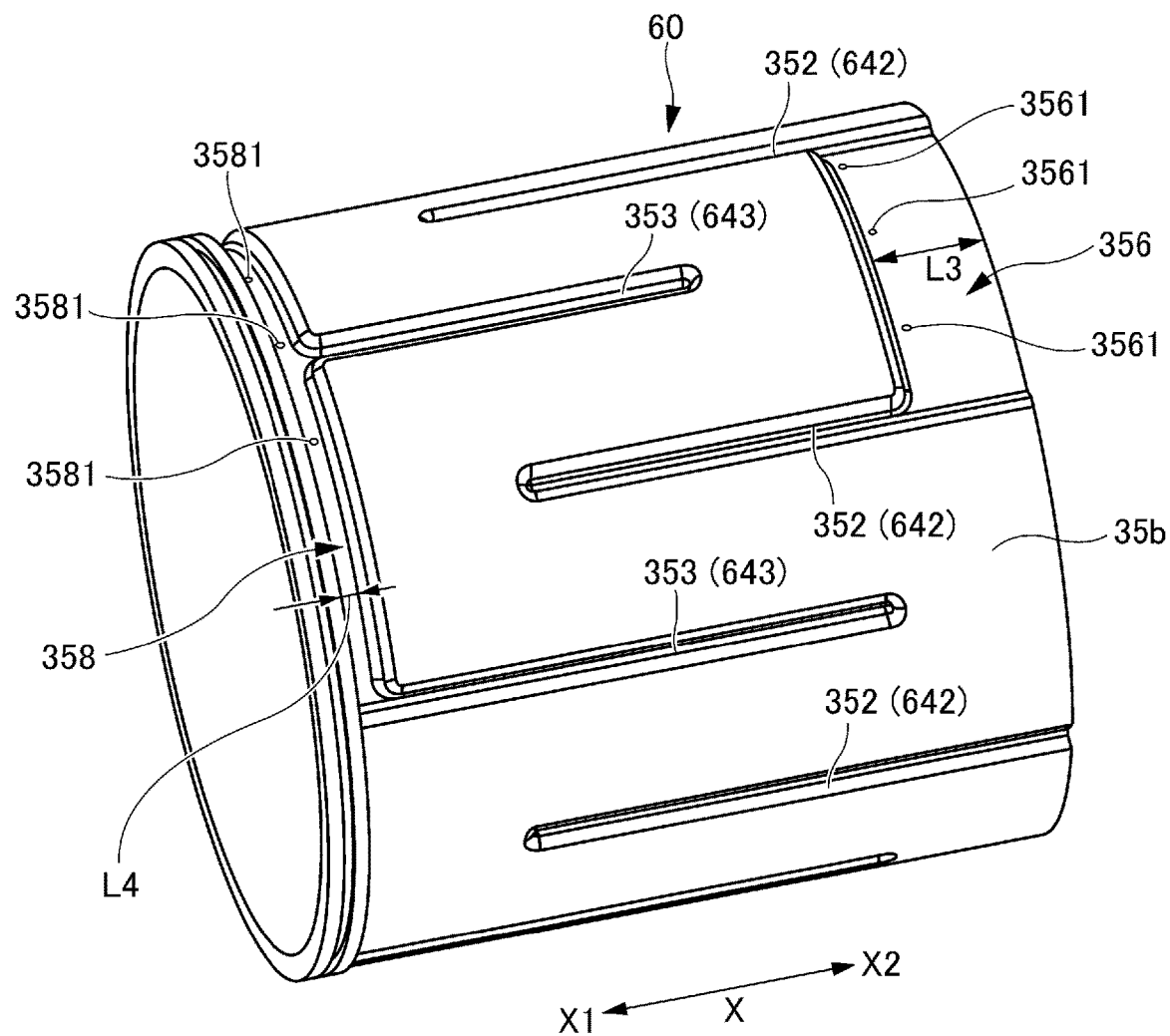
FIG. 15 is a perspective view showing an upper side of the retaining ring.

The recessed oil passages 351, 352, 353 are formed by the recessed grooves 641, 642, 643, respectively, as shown in FIG. 11 and FIG. 15 described later. The recessed grooves 641, 642, 643 are as described above. The recessed oil passages 351, 352, 353 are continuous with the cylindrical oil passage 354 in the radial direction. The recessed oil passages 351, 352, 353 may have a cross-sectional shape (a cross-sectional shape viewed in the X direction) that is constant, or the cross-sectional shape may change depending on the position in the X direction.

The endmost portion on the X2 side in the X direction of the recessed oil passage 351 forms the oil inlet portion 35a and is connected to the inlet oil passage 330. The recessed oil passage 351 is linearly continuous with the inlet oil passage 330 in the X direction, as shown in FIG. 14. The recessed oil passage 351 has a function of efficiently spreading the oil introduced from the inlet oil passage 330 via the oil inlet portion 35a (introduced toward the X1 side in the X direction) to the X1 side in the X direction of the retaining ring 60 (hereinafter, also referred to as an "oil diffusion function in the axial direction"). That is, the oil introduced from the inlet oil passage 330 via the oil inlet portion 35a linearly flows in the recessed oil passage 351 toward the X1 side in the X direction and thus, it becomes easy for the oil to reach the end portion on the X1 side in the X direction of the retaining ring 60. From the viewpoint of enhancing the oil diffusion function in the axial direction, the recessed oil passage 351 extends to the end portion 640 (see FIG. 7) on the X1 side in the X direction of the retaining ring 60.

Since the oil inlet portion 35a is formed by the endmost portion of the recessed oil passage 351 on the X2 side in the X direction, the oil inlet portion 35a is positioned at the corner portion formed by the bottom surface portion 62 and the cylindrical portion 64 of the retaining ring 60. Since the oil inlet portion 35a is formed by the endmost portion of the recessed oil passage 351 on the X2 side in the X direction, the oil inlet portion 35a is positioned between the cooling water inlet portion 62d and the cooling water outlet portion 62e in the circumferential direction (see FIG. 5).

Here, the recessed oil passages 351, 352, 353 are adjacent to the meandering water passage 950 in the circumferential direction. Specifically, in the meandering water passage 950, the first flow passage portions 9501 adjacent to each other in the circumferential direction are partitioned by the recessed grooves 641, 642, 643, as shown in FIG. 11. Thus, the first flow passage portions 9501 are adjacent to the recessed oil passages 351, 352, 353 in the circumferential direction. In this case, since the case oil passage 35 is adjacent to the meandering water passage 950 (first flow passage portions 9501) on both sides of the recessed oil passages 351, 352, 353 in the circumferential direction, satisfactory heat exchange between cooling water and oil is achieved on both sides of the recessed oil passages 351, 352, 353 in the circumferential direction. Thus, even in the recessed oil passages 351, 352, 353 that do not face the meandering water passage 950 in the radial direction, heat is exchanged with the cooling water in the meandering water passage 950 and thus, the heat exchange capacity as a whole can be improved.

In the modification, any one or all of the recessed oil passages 351, 352, 353 may be omitted. That is, any or all of the recessed grooves 641, 642, 643 may be solid. For example, the recessed grooves 642, 643 among the recessed grooves 641, 642, 643 may be solid. Also in this case, since the case oil passage 35 includes the cylindrical oil passage 354 between the boundary surfaces 35*b* and 35*c* when viewed in the X direction, heat exchange between the cooling water and the oil via the boundary surface 35*b* is satisfactorily realized. However, when the recessed groove 641 is solid, it is disadvantageous in that the oil diffusion function in the axial direction by the recessed oil passage 351 is lowered.

The cylindrical oil passage 354 corresponds to a part excluding the recessed oil passages 351, 352, 353 and the oil dropping portions 356, 358, among the oil passages formed between the retaining ring 60 and the case 70 in the radial direction (that is, the cylindrical oil passages formed between the boundary surface 35*b* and the boundary surface 35*c* in the radial direction). Thus, the cylindrical oil passage 354 is formed over substantially the entire outer peripheral surface of the retaining ring 60 (the entire portion excluding the end portion 640). The cylindrical oil passage 354 may be formed to have a constant radial dimension.

In the cylindrical oil passage 354, a part excluding the part continuous with the recessed oil passages 351, 352, 353 and the oil dropping portions 356, 358 in the radial direction, among the entire cylindrical oil passage 354, faces the meandering water passage 950 in the radial direction. That is, excluding the oil in the portion that is continuous in the radial direction with the recessed oil passages 351, 352, 353 and the oil dropping portions 356, 358, only the outer radial side wall surface part 652 of the retaining ring 60 is interposed between the oil in the cylindrical oil passage 354 and the cooling water in the meandering water passage 950 in the radial direction. Thus, heat exchange can be performed for most of the oil in the cylindrical oil passage 354 in a direct manner with the cooling water in the meandering water passage 950 (a manner in which only the outer radial side wall surface part 652 of the retaining ring 60 is interposed).

In the cylindrical oil passage 354, a part excluding the part continuous with the recessed oil passages 351, 352, 353 and the oil dropping portions 356, 358 in the radial direction, among the entire cylindrical oil passage 354, faces the meandering water passage 950 in the radial direction. That is, excluding the oil in the portion that is continuous in the radial direction with the recessed oil passages 351, 352, 353 and the oil dropping portions 356, 358, only the outer radial side wall surface part 652 of the retaining ring 60 is interposed between the oil in the cylindrical oil passage 354 and the cooling water in the meandering water passage 950 in the radial direction. Thus, heat exchange can be performed for most of the oil in the cylindrical oil passage 354 in a direct manner with the cooling water in the meandering water passage 950 (a manner in which only the outer radial side wall surface part 652 of the retaining ring 60 is interposed).

The oil dropping portions 356, 358 are formed in the zenith region of the retaining ring 60 and at positions that face the coil end 110 in the radial direction. The zenith region of the retaining ring 60 represents the highest position of the retaining ring 60 and the peripheral region thereof. For example, the zenith region may be a range of about 60 degrees in the circumferential direction with the circumferential position corresponding to the highest position serving as the center. The oil dropping portion 356 is provided for the coil end 110 on the X2 side in the X direction, and the oil dropping portion 358 is provided for the coil end 110 on the X1 side in the X direction. The oil dropping portions 356, 358 are continuous with the cylindrical oil passage 354 in the radial direction.

The oil dropping portions 356, 358 are in the form of being recessed radially inward similar to the recessed grooves 641, 642, 643, and are continuous with the recessed grooves 642, 643, respectively. That is, the oil dropping portion 356 extends in the circumferential direction in a manner such that the end portion on the X2 side in the X direction of the retaining ring 60 is integrated with the two recessed grooves 642 that are adjacent in the circumferential direction. In addition, the oil dropping portion 358 extends in the circumferential direction in a manner such that the end portion on the X1 side in the X direction of the retaining ring 60 is integrated with the three recessed grooves 643 that are adjacent in the circumferential direction.

The meandering water passage 950 is not formed in the range of the retaining ring 60 in which the oil dropping portions 356 and 358 are formed. That is, as shown in FIG. 15, the meandering water passage 950 is formed in a range not exceeding the oil dropping portions 356, 358 in the circumferential range of the retaining ring 60 in which the oil dropping portions 356, 358 are formed.

The oil dropping portion 356 is formed with oil dropping holes 3561 passing through in the radial direction. The number of the oil dropping holes 3561 is arbitrary. However, in the present embodiment, three oil dropping holes 3561 are formed as an example. That is, as shown in FIG. 15, three oil dropping holes 3561 are formed at equal intervals in the circumferential direction. The oil dropping holes 3561 are formed on the end portion side on the X1 side of the oil dropping portion 356. In other words, the oil dropping portion 356 is a constraint on the formation range of the meandering water passage 950 and thus, the oil dropping portion 356 is formed in the minimum range in the X direction in order to maximize the formation range of the meandering water passage 950.

Oil dropping holes 3581 passing through in the radial direction are formed in the oil dropping portion 358. The number of the oil dropping holes 3581 is arbitrary. However, in the present embodiment, three oil dropping holes 3581 are formed as an example. That is, as shown in FIG. 15, the three oil dropping holes 3581 are formed at equal intervals in the circumferential direction.

The length L3 of the oil dropping portion 356 in the X direction (see also FIG. 12) is significantly longer than the length L4 of the oil dropping portion 358 in the X direction (see also FIG. 12). The length L3 and the length L4 are determined according to the positional relationship of the stator core 112 with respect to the retaining ring 60 in the X direction. Specifically, the oil dropping portions 356, 358 are provided so that the oil dropping holes 3561 and the oil dropping holes 3581, which face the coil end 110 on the X2 side and the coil end 110 on the X1 side, respectively in the radial direction, can be formed.

Next, the flow of oil in the case oil passage 35 will be outlined with reference to FIGS. 5, 14, and 16 to 18 described above.

In FIGS. 5, 14, and 16 to 18, the flow of oil in the case oil passage 35 is schematically shown by arrows R20 to R26.

As shown in FIG. 14, the oil is supplied from the inlet oil passage 330 (see the arrow R20 in FIG. 14) and introduced from the oil inlet portion 35*a* into the recessed oil passage 351 between the retaining ring 60 and the case 70. The oil introduced from the oil inlet portion 35*a* into the recessed oil passage 351 flows linearly through the recessed oil passage 351 (see R21 in FIGS. 5 and 14), and is introduced into the cylindrical oil passage 354 on the outer radial side (see R22 in FIG. 14). The oil introduced into the cylindrical oil passage 354 flows in the circumferential direction and upward (see R23 in FIGS. 5 and 16), and reaches the oil dropping portions 356, 358 in the zenith region (see R24 in FIG. 16).

Here, in the present embodiment, the case oil passage 35 (cylindrical oil passage) between the retaining ring 60 and the case 70 in the radial direction has a substantially constant radial dimension over the entire length in the X direction within a predetermined range in the circumferential direction. Specifically, the case oil passage 35 has a substantially constant radial dimension over the entire length in the X direction, in a range (predetermined range) excluding the formation range of the recessed oil passages 351, 352, 353 and the oil dropping portions 356, 358, in the circumferential direction. In this case, the flow of the oil in the circumferential direction (see R23 in FIGS. 5 and 16) is made more uniform than in the case in which the radial dimension changes significantly over the entire length in the X direction. Thus, the oil that reaches the oil dropping portions 356, 358 in the zenith area can be uniformly cooled by the cooling water.

Further, in the present embodiment, the recessed oil passage 351 into which oil is introduced from the oil inlet portion 35a is adjacent to the first flow passage portion 9501 (the first flow passage portion 9501-1 in FIG. 12) that is directly connected to the inlet water passage 951 among the first flow passage portions 9501 as described above. As a result, the oil introduced into the case oil passage 35 can be spread in the case oil passage 35 after being cooled by the cooling water, which has the lowest temperature, in the recessed oil passage 351. As a result, the cooling capacity of the oil in the case oil passage 35 can be efficiently increased.

Different from the other first flow passage portions 9501, the first flow passage portion 9501-1 and the first flow passage portion 9501-12 are only connected to the second flow passage portion 9502 at one end side (in the present example, the end portion on the X1 side in the X direction), as described above with reference to FIG. 12. Thus, the recessed oil passage 351 adjacent to the first flow passage portion 9501-1 can be formed in a manner in which the recessed oil passage 351 extends to the end portion on the X1 side in the X direction without being restricted by the second flow passage portion 9502. In this way, when the recessed oil passage 351 is adjacent to the first flow passage portion 9501-1, the oil that spreads in the case oil passage 35 can be efficiently cooled, and the oil diffusion function in the axial direction described above can be achieved.

The oil that reaches the oil dropping portion 356 is dropped from the oil dropping holes 3561 (see R25 in FIGS. 16 and 17) and cools the coil end 110 directly below. Similarly, the oil that reaches the oil dropping portion 358 is dropped from the oil dropping holes 3581 (see R26 in FIG. 18) to cool the coil end 110 directly below. The oil used for cooling the coil end 110 in this manner flows downward along the coil end 110 due to gravity, and accumulates in the lower portion (oil sump space) of the motor 10. The oil accumulated in the oil sump space is discharged from the oil outlet hole 62c to the outside of the motor 10 via the outlet oil passage 360 (see FIG. 9). The oil accumulated in the oil sump space also has a function of cooling the portion of the stator 10b that is immersed in the oil (including a part of the coil end 110).

Figure 16:
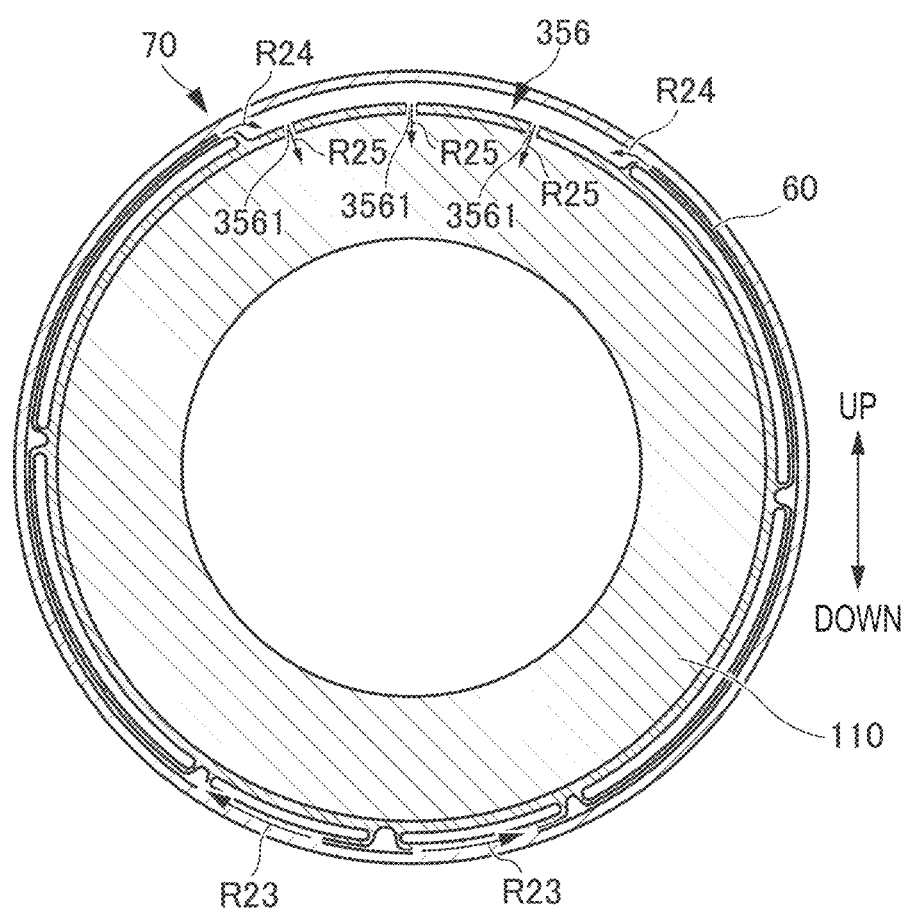
FIG. 16 is a cross-sectional view through an oil dropping hole of an oil dropping portion.

In this way, the oil reaches the oil dropping portions 356, 358 through the outer peripheral surface of the retaining ring 60 forming the meandering water passage 950 of the cooling water passage 95 (see R23 in FIGS. 5 and 16). The oil is cooled by the cooling water when passing through the outer peripheral surface of the retaining ring 60. Thus, the cooling capacity of the oil reaching the oil dropping portions 356, 358 is high. Since the oil having such a high cooling capacity is used for cooling the coil end 110, the coil end 110 can be efficiently cooled. That is, since the oil flows in a manner of contacting the outer peripheral surface of the retaining ring 60, the oil is efficiently cooled by the cooling water and the coil end 110 can be efficiently cooled by the cooled oil.

According to the stator cooling structure 402 of the present embodiment described above, the following effects are particularly achieved.

According to the stator cooling structure 402 of the present embodiment, since the retaining ring 60 forming the meandering water passage 950 is in contact with the stator core 112, only the inner radial side wall surface portion 651 of the retaining ring 60 is provided between the cooling water and the stator core 112. Here, the cooling water is cooled by heat exchange with the outside air (for example, the air passing through when the vehicle is traveling) in the radiator 92 as described above, the oil is cooled by heat exchange with the cooling water by the heat exchange/water cooling portion 50 and thus, the cooling water has a lower temperature than the oil. Therefore, the stator core 112 can be efficiently cooled by the cooling water as compared to the case in which another medium or member such as oil is interposed between the cooling water and the stator core 112.

Further, according to the stator cooling structure 402 of the present embodiment, since the retaining ring 60 forms the meandering water passage 950, it is possible to take heat from a wide area of the stator core 112 with the cooling water flowing through the meandering water passage 950. Particularly, according to the stator cooling structure 402 of the present embodiment, as described above, since the meandering water passage 950 is formed so as to travel back and forth over the entire stator core 112 in the X direction, heat can be taken from the entire stator core 112.

According to the stator cooling structure 402 of the present embodiment, the outer peripheral surface of the retaining ring 60 functions as the boundary surface 35b of the case oil passage 35. That is, since the retaining ring 60 forming the meandering water passage 950 forms the case oil passage 35, only the outer radial side wall surface part 652 of the retaining ring 60 is provided between the cooling water and the oil in the radial direction. Thus, the oil can be efficiently cooled by the cooling water as compared to the case in which another member is interposed between the cooling water and the oil. Therefore, with to the stator cooling structure 402, the oil cooler can be omitted even in the motor 10 having a relatively high output.

Further, according to the stator cooling structure 402 of the present embodiment, since the retaining ring 60 forms the meandering water passage 950, it is possible to efficiently expand the range in which heat exchange can be performed between the oil and the cooling water flowing through the meandering water passage 950, among the cylindrical oil passage 354 of the case oil passage 35. In particular, according to the stator cooling structure 402 of the present embodiment, as described above, since the meandering water passage 950 is formed so as to travel back and forth along the entirety of the inner peripheral surface of the case 70 excluding the region facing the oil dropping portions 356, 358, it is possible to maximize the range in which heat exchange can be performed between the oil and the cooling water flowing through the meandering water passage 950 among the cylindrical oil passage 354 of the case oil passage 35.

In addition, by forming the meandering water passage 950, it is possible to regulate the flowing direction of the cooling water. For example, compared to the case in which the cooling water flows linearly from the cooling water inlet portion 62d to the cooling water outlet portion 62e, there is no stagnation, etc. and the range in which a significant flow velocity is generated (the range in which heat exchange is substantially realized) becomes large. Further, in the case of the meandering water passage 950, random flow resulting from turbulent flow is likely to occur and heat diffusion in the cooling water is likely to occur correspondingly. As a result, the heat exchange function of the heat exchange/water cooling portion 50 and the stator core water cooling function described above can be enhanced.

Further, according to the stator cooling structure 402 of the present embodiment, the cooling water passage (that is, the inlet water passage 951 and the outlet water passage 952) is also formed in the bottom surface portion 62 that extends in the radial direction in the retaining ring 60. Thus, compared to the case in which the cooling water passage is not formed in the bottom surface portion 62, the oil accumulated in the oil sump space of the motor 10 can be efficiently cooled. That is, due to the overlap disposition of the inlet water passage 951 and the outlet water passage 952 with the oil sump space when viewed in the X direction, the oil accumulated in the oil sump space can be efficiently cooled by the cooling water in the inlet water passage 951 and the outlet water passage 952. In particular, since cooling water having a relatively low temperature flows in the inlet water passage 951, the oil accumulated in the oil sump space of the motor 10 can be efficiently cooled due to the inlet water passage 951 being formed in the bottom surface portion 62.

According to the stator cooling structure 402 of the present embodiment, since the cooling water inlet portion 62d and the cooling water outlet portion 62e are formed on the bottom surface portion 62 of the retaining ring 60, the cooling capacity by the inlet water passage 951 and the outlet water passage 952 can be enhanced, compared to the case in which the cooling water inlet portion and/or the cooling water outlet portion is provided in the cylindrical portion 64 of the retaining ring 60. This is because, for example, when the cooling water inlet portion is provided in the cylindrical portion 64 of the retaining ring 60, the cooling water in the inlet water passage 951 tends to be retained and thus, the cooling capacity tends to deteriorate. Further, by forming the cooling water inlet portion 62d and the cooling water outlet portion 62e on the bottom surface portion 62 of the retaining ring 60, the physical size in the radial direction can be minimized, compared to the case in which the cooling water inlet portion and/or the cooling water outlet portion is formed in the cylindrical portion 64 of the retaining ring 60.

Further, according to the stator cooling structure 402 of the present embodiment, since the recessed oil passage 351 provided with the oil inlet portion 35a is adjacent to the meandering water passage 950 in the circumferential direction, the oil introduced into the case oil passage 35 can be cooled (heat exchange can be performed) in the recessed oil passage 351 by the cooling water in the meandering water passage 950. That is, the oil introduced into the case oil passage 35 can be cooled from an early stage by utilizing heat exchange in the circumferential direction.

In particular, the first flow passage portion 9501 adjacent to the recessed oil passage 351 is the first flow passage portion 9501-1 that is closest to the cooling water inlet portion 62d, among the first flow passage portions 9501. The cooling water in the first flow passage portion 9501-1 closest to the cooling water inlet portion 62d has a lower temperature than the cooling water in the other first flow passage portions 9501. Thus, heat exchange can be performed between the oil in the recessed oil passage 351 and the cooling water in the first flow passage portion 9501-1 that has the highest cooling function (that is, fresh cooling water introduced from the cooling water inlet portion 62d), among the first flow passage portions 9501.

Further, according to the stator cooling structure 402 of the present embodiment, the recessed oil passage 351 provided with the oil inlet portion 35a is positioned below the other recessed oil passages 352, 353 (that is, at the lowest portion). Here, as described above, the oil introduced into the recessed oil passage 351 linearly flows in the recessed oil passage 351 in the X direction, flows in the circumferential direction and to the upper side from both sides of the recessed oil passage 351 in the circumferential direction, reaches the oil dropping portions 356, 358 from both side in the circumferential direction, and dropped in the coil end 110 to be supplied for cooling the coil end 110. Thus, since the time it takes for the oil from each of the both sides of the recessed oil passage 351 in the circumferential direction to reach the oil dropping portions 356, 358 on the upper side is substantially the same, the cooling time during that time (the heat exchange time between the oil and the cooling water) is substantially the same. In this way, the oil can evenly flow in the circumferential direction from each of both sides of the recessed oil passage 351 in the circumferential direction to the oil dropping portions 356, 358. As a result, the cooling capacity of the oil that is introduced from the oil inlet portion 35a and that reaches the oil dropping portions 356, 358 can be equalized.

In the present embodiment, the oil in the case oil passage 35 may be constantly circulated during the operation of the motor 10, or may be circulated for a part of the period during the operation of the motor 10. For example, since the oil in the case oil passage 35 is mainly used for cooling the coil end 110 as described above, the oil may be circulated only during a period when the heat generation of the coil end 110 is relatively large.

Although each embodiment has been described in detail above, the present disclosure is not limited to the specific embodiments, and various modifications and changes can be made within the scope of the claims. Further, it is possible to combine all or a plurality of the configuration elements of the embodiments described above.

For example, in the embodiment described above, the cooling water inlet portion 62d and the cooling water outlet portion 62e are formed on the bottom surface portion 62 of the retaining ring 60. However, the configuration is not limited to this. For example, among the cooling water inlet portion 62d and the cooling water outlet portion 62e, only the cooling water inlet portion 62d may be formed on the bottom surface portion 62 of the retaining ring 60. In this case, the cooling water outlet portion 62e may be formed in the cylindrical portion 64 of the retaining ring 60 in a manner such that the cooling water outlet portion 62e is connected in the radial direction to the end portion on the X2 side in the X direction of the first flow passage portion 9501-12 of the meandering water passage 950, or the outlet water passage 952 may be omitted. Similarly, in another modification, the cooling water inlet portion 62d and the cooling water outlet portion 62e may be formed in the cylindrical portion 64 of the retaining ring 60, and the inlet water passage 951 and the outlet water passage 952 may be omitted.

Further, the cooling water inlet portion 62*d* and the cooling water outlet portion 62*e* are provided on the bottom surface portion 62 of the retaining ring 60 so as to be adjacent to each other in the circumferential direction. However, the configuration is not limited to this. For example, the cooling water inlet portion 62*d* and the cooling water outlet portion 62*e* may be provided on the bottom surface portion 62 of the retaining ring 60 while being offset 40 degrees or more in the circumferential direction, for example. Further, the cooling water inlet portion 62*d* and the cooling water outlet portion 62*e* may be provided on the bottom surface portion 62 of the retaining ring 60 while being offset in the circumferential direction and the radial direction.

Figure 19:
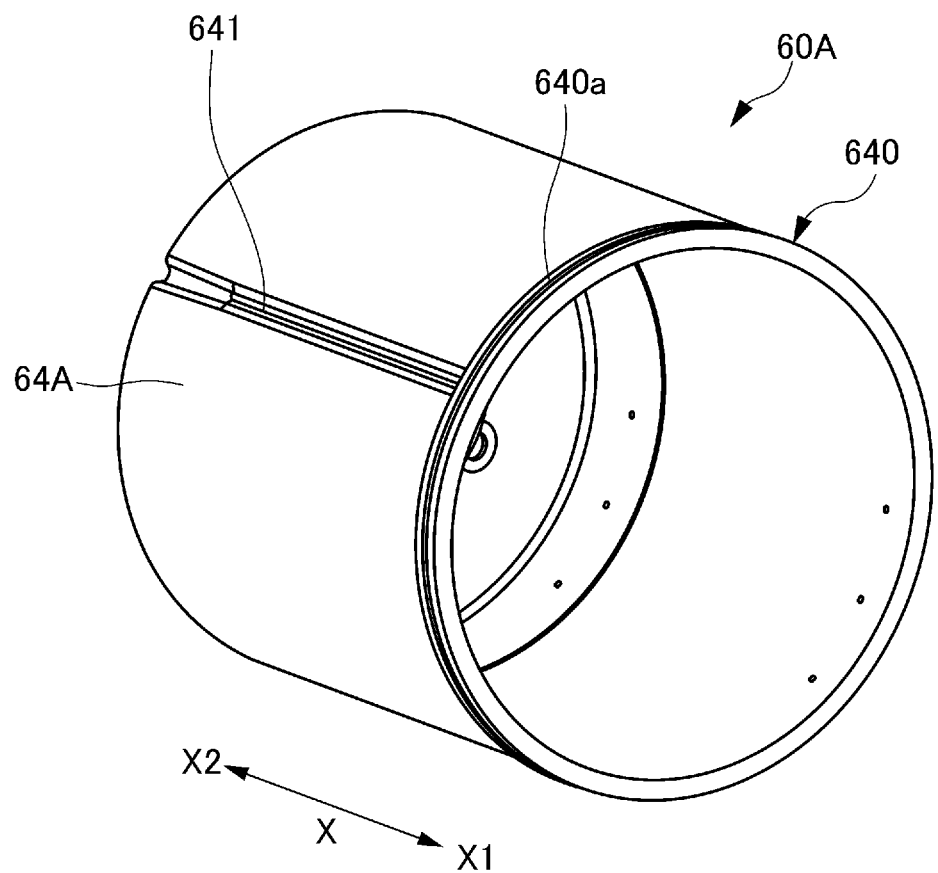
FIG. 19 is an explanatory diagram of a modification.

In the embodiment described above, as a preferred embodiment, the meandering water passage 950 is formed in the cylindrical portion 64 of the retaining ring 60. However, the configuration is not limited to this. For example, like a retaining ring 60A according to the modification shown in FIG. 19, a cylindrical cooling water passage may be formed in a cylindrical portion 64A of the retaining ring 60A. In this case, compared to the retaining ring 60 in the embodiment described above, the retaining ring 60A has a configuration in which the recessed grooves 642 and 643 are not formed and the partition wall formed by the recessed grooves 642 and 643 does not exist. Even in this case, since the retaining ring 60A forming the cylindrical cooling water passage is in contact with the stator core 112, the same effect as that of the embodiment described above can be obtained. However, in the present modification, since the degree of freedom of the flow of the cooling water is high in the cylindrical cooling water passage, the range in which the flow velocity does not occur increased. Thus, the present modification is more disadvantageous than the embodiment described above. In this respect, also in the present modification, the partition wall (the partition wall such as the recessed grooves 642, 643) that restricts the flow of the cooling water may be formed in a manner extending in the circumferential direction or the like.

In addition, in the embodiment described above, as a preferred embodiment, the recessed oil passage 351 forming the oil inlet portion 35*a* is adjacent to the first flow passage portion 9501-1 (that is, the first flow passage portion 9501-1 that is directly connected to the inlet water passage 951) through which the cooling water having the lowest temperature passes, among the first flow passage portions 9501 that form the meandering water passage 950. However, the configuration is not limited to this. For example, the recessed oil passage 351 forming the oil inlet portion 35*a* may be adjacent to another first flow passage portion 9501 in the circumferential direction instead of being adjacent to the first flow passage portion 9501-1 in the circumferential direction. In this case, the effect when the recessed oil passage 351 is adjacent to the first flow passage portion 9501-1 (that is, the effect that the oil that spreads in the case oil passage 35 can be efficiently cooled and the oil diffusion in the axial direction described above can be maximized) cannot be obtained. However, other effects of the embodiment described above can still be obtained.

Further, the case oil passage 35 (cylindrical oil passage) between the retaining ring 60 and the case 70 in the radial direction has a substantially constant radial dimension along the entirety in the X direction, in a predetermined circumferential range (the range excluding the recessed oil passages 351, 352, 353 and the oil dropping portions 356, 358). However, the configuration is not limited to this. For example, the case oil passage 35 may have recesses and protrusions, steps, or the like even in the range excluding the formation range of the recessed oil passages 351, 352, 353 and the oil dropping portions 356, 358.

In the embodiment described above, the recessed oil passage 351 and the first flow passage portions 9501-1 and 9501-12 are arranged in the lowermost region. However, the configuration is not limited to this. The recessed oil passage 351 and the first flow passage portions 9501-1 and 9501-12 may be provided in such a manner that the recessed oil passage 352 or the recessed oil passage 353 is formed below the recessed oil passage 351.

Further, in the embodiment described above, the recessed oil passage 351 extends in the X direction with a substantially uniform cross-section (the cross-section viewed in the X direction), and the endmost portion on the X2 side in the X direction forms the oil inlet portion 35*a*. Thus, the oil inlet portion 35*a* is formed at the corner portion formed by the bottom surface portion 62 and the cylindrical portion 64. However, the configuration is not limited to this. For example, the recessed oil passage 351 may be bent radially inward at the end portion on the X2 side in the X direction, and the oil inlet portion 35*a* may be formed in the bottom surface portion 62.

In the embodiment described above, the case oil passage 35 has the cylindrical oil passage 354 that faces the meandering water passage 950 in the radial direction. However, the configuration is not limited to this. For example, the case oil passage 35 may not have the cylindrical oil passage 354 and may be in the form of a meandering oil passage that is arranged in parallel with the meandering water passage.

In this case, the meandering oil passage may be provided so as to be adjacent to the meandering water passage in the circumferential direction. Further, in this case, the meandering oil passage may be formed so as not to intersect with the meandering water passage, or may be formed so as to intersect with the meandering water passage. In the case of the intersecting form, in the intersecting region, the thickness of the meandering oil passage and the meandering water passage in the radial direction may be reduced so that the increase in the thickness in the intersecting region is suppressed.

Appendix

The following is further disclosed with respect to the above embodiments. Note that, among the effects described below, the effect of each additional aspect to one aspect is an additional effect resulting from each of the additional aspects.

An aspect is a stator cooling structure (402) including a supporting member (60, 60A, 70) that has a cylindrical shape along an axial direction (X) of a rotating electric machine (10), that supports a stator core (112) of the rotating electric machine (10), and that forms a cooling water passage (95) through which cooling water passes and an oil passage (35) through which oil passes, in which the stator core, the cooling water passage, and the oil passage are disposed adjacent to each other in this order from an inner radial side.

According to the present aspect, since the cooling water passage (95) is adjacent to the stator core (112), the stator core (112) can be directly cooled by the cooling water (the cooling water passing through the cooling water passage (95)). Thus, the stator core (112) can be cooled more efficiently than when another medium (for example, oil) is interposed between the stator core (112) and the cooling water. Further, since the cooling water passage (95) is adjacent to the oil passage (35), the oil in the oil passage (35) can be directly cooled by the cooling water in the cooling water passage (95). In this way, the efficiency of heat exchange between the oil in the oil passage (35) and the cooling water passing through the cooling water passage (95) can be increased.

Further, in the present aspect, it is preferable that the stator cooling structure (402) further include an oil circulation portion (400) that circulates the oil through the oil passage, and the oil circulated by the oil circulation portion be supplied to a specific part of the rotating electric machine.

In this case, the oil can be cooled (heat exchange can be performed) in the oil passage (35) by the cooling water in the cooling water passage (95) while circulating the oil through the oil passage (35). That is, heat exchange is realized between the cooling water in the cooling water passage (95) and the oil in the oil passage (35) while circulating the oil. Thus, the specific part (for example, the coil end) of the rotating electric machine (10) can be cooled by using the oil in the oil passage (35). Further, in the present aspect, it is preferable that the stator cooling structure (402) further include a cooling water circulation portion (401) that circulates the cooling water through the cooling water passage, the cooling water circulation portion include a heat exchange portion (92) that removes heat from the cooling water, and the oil circulation portion do not include an oil cooler.

This is because, as described above, the oil can be cooled (heat exchange can be performed) in the oil passage (35) by the cooling water in the cooling water passage (95) while circulating the oil. In this case, the required oil cooling performance can be ensured while eliminating the oil cooler to reduce the cost.

Further, in the present aspect, it is preferable that the supporting member (60, 60A, 70) have an oil dropping hole (3561, 3581) in a zenith region for dropping the oil on a coil end (110) of the rotating electric machine (10), the oil passage (35) be in communication with the oil dropping hole (3561, 3581), and an oil inlet portion (35a) for introducing the oil into the oil passage be provided in a lowermost region of the supporting member.

In this case, the cooling water in the cooling water passage (95) can cool the oil in the oil passage (35) from the lowermost region. Also, the coil end (110) can be cooled by dropping oil from the oil dropping holes (3561, 3581) formed by using the supporting members (60, 60A, 70). Further, since the oil to be dropped is the oil in the oil passage (35) introduced from the oil inlet portion (35a) in the lowermost region and the oil is cooled by the cooling water passage (95), the coil end (110) can be efficiently cooled.

Further, in the present aspect, it is preferable that the supporting member (60, 60A, 70) support the stator core (112) in a manner in which an outer peripheral surface of the stator core (112) is in surface contact with an inner peripheral surface of the supporting member (60, 60A, 70), the supporting member (60, 60A, 70) have a boundary surface (35b) between the cooling water passage (95) and the oil passage (35), and the stator core (112) and the cooling water be allowed to exchange heat via the inner peripheral surface and the cooling water and the oil be allowed to exchange heat via the boundary surface (35b).

In this case, the oil in the oil passage (35) can be effectively cooled by the cooling water in the cooling water passage (95) via the boundary surface (35b), and the stator core (112) can be effectively cooled by the cooling water in the cooling water passage (95) via the inner peripheral surface of the supporting member (60, 60A, 70).

Further, in the present aspect, it is preferable that the cooling water passage and the oil passage extend in a circumferential direction in an extension range of the stator core in the axial direction.

In this case, the cooling water passage (95) extends in the circumferential direction in a manner adjacent to the stator core (112). This allows the cooling water passage (95) to effectively cool the stator core (112) in the circumferential direction while effectively cooling the oil in the oil passage (35) along the circumferential direction with the cooling water passage (95).

In a stator cooling structure (402), a stator core (112), a cooling water passage (95), and an oil passage (35) are adjacent to each other in this order from an inner radial side, and the cooling water passage and the oil passage extend in a circumferential direction in an extension range of the stator core in an axial direction.

According to the present aspect, since the cooling water passage (95) is adjacent to the stator core (112), the stator core (112) can be directly cooled by the cooling water (the cooling water passing through the cooling water passage (95)). Thus, the stator core (112) can be cooled more efficiently than when another medium (for example, oil) is interposed between the stator core (112) and the cooling water. Further, since the cooling water passage (95) is adjacent to the oil passage (35), the oil in the oil passage (35) can be directly cooled by the cooling water in the cooling water passage (95). In this way, the efficiency of heat exchange between the oil in the oil passage (35) and the cooling water passing through the cooling water passage (95) can be increased. Moreover, since the cooling water passage (95) and the oil passage (35) extend in the circumferential direction in the extension range of the stator core (112) in the axial direction, the cooling water passage (95) can effectively cool the stator core (112) along the circumferential direction with the cooling water passage (95), and the oil in the oil passage (35) can be effectively cooled by the cooling water passage (95) in the circumferential direction.

Further, in the present aspect, the supporting member (60, 60A, 70) may be in contact with substantially the entire outer peripheral surface of the stator core (112).

In this case, substantially the entire outer peripheral surface of the stator core (112) can be cooled by the cooling water in the cooling water passage (95). As a result, the cooling capacity of the stator core (112) with the cooling water can be made uniform.

Further, in the present aspect, the oil passage (35) may be formed over the entire circumference of the supporting member (60, 60A, 70).

In this case, heat can be exchanged between the oil in the oil passage (35) and the cooling water flowing in the cooling water passage (95) over the entire circumference of the supporting member (60, 60A, 70).

Further, in the present aspect, the oil passage (35) may have a cylindrical shape, and the dimension in the radial direction may be substantially constant over the entire length in the axial direction (X) within a predetermined circumferential range.

In this case, the distribution of the oil flowing in the cylindrical oil passage (35: 351 to 354, 356, 358) in the circumferential direction can be made uniform along the axial direction. As a result, the amount of heat exchange between the oil flowing in the circumferential direction and the cooling water can be made uniform along the axial direction.

In addition, in the present aspect, the supporting member (60, 60A, 70) may include the first part (64, 64A) that is in contact with the outer peripheral surface of the stator core (112) and the second part (62) facing the end surface in the axial direction (X) of the stator core (112), and the cooling water passage (95) may include a first cooling water passage (95) formed in the first part (64, 64A) and a second cooling water passage (95) formed in the second part (62).

In this case, in addition to the first cooling water passage (95), the oil can be cooled by the second cooling water passage (95). In particular, since the second cooling water passage (95) extends in the radial direction, depending on the disposition of the second cooling water passage (95), it is possible to cool the oil accumulated in the oil sump space.

Further, in the present aspect, the first cooling water passage (95) may be formed in such a manner that cooling water travels back and forth in the axial direction (X) and flows in the circumferential direction of the rotating electric machine (10).

In this case, since the cooling water flows in a meandering manner, a region in which a significant flow velocity is generated is increased compared to the case in which the cooling water flows in a cylindrical flow passage without meandering, and the cooling capacity (and heat exchange capacity) by the cooling water can increased.

Further, in the present aspect, the supporting member (60, 60A, 70) may have the cooling water inlet portion (62d) connected to the second cooling water passage (95) in the second part (62).

In this case, fresh cooling water (cooling water that has not cooled other parts of the rotating electric machine (10)) can be introduced from the cooling water inlet portion (62d) into the second cooling water passage (95) extending in the radial direction. Thus, depending on the disposition of the second cooling water passage (95), it is possible to cool the oil accumulated in the oil sump space with fresh cooling water. As a result, it is possible to cool parts of the coil end and the like that are immersed in the oil that is accumulated in the oil sump space.

Further, in the present aspect, the second cooling water passage (95) can be positioned below the center of the stator core (112) when viewed in the axial direction (X) and may be overlapped with the stator core (112) when viewed in the axial direction (X).

In this case, it is possible to realize the disposition of the second cooling water passage (95) in which the oil accumulated in the oil sump space can be cooled by the cooling water in the second cooling water passage (95).

DESCRIPTION OF THE REFERENCE NUMERALS

1 Vehicle drive device
3 Lubrication/cooling system
10 Motor
10a Rotor
10b Stator
12 Speed reduction mechanism
14 Differential device
22 Lubrication part
23 Cooled part
30 Tank
30a Strainer
31 Oil passage
32 Oil passage
33 Oil passage
34 Oil passage
35 Case oil passage (oil passage)
35a Oil inlet
35b Boundary surface
35c Boundary surface
36 Oil passage
40 Electric oil pump
42 Mechanical oil pump
50 Heat exchange/water cooling portion
60, 60A Retaining ring
62 Bottom portion
62a Hole
62b Through hole
62c Oil outlet hole
62d Cooling water inlet
62e Cooling water outlet
62f Bulging portion
62g Bulging portion
64, 64A Cylindrical portion
70 Case
90 Water pump
92 Radiator
94 Cooling water passage
95 Cooling water passage
110 Coil end
112 Stator core
140 Ring gear
141 Pinion gear
142 Side gear
330 Inlet oil passage
351 Recessed oil passage
352 Recessed oil passage
353 Recessed oil passage
354 Cylindrical oil passage
356 Oil dropping portion
358 Oil dropping portion
360 Outlet oil passage
400 Oil circulation portion
401 Cooling water circulation portion
402 Stator cooling structure
640 End portion
640a Seal groove
641 Recessed groove
642 Recessed groove
643 Recessed groove
650 Wall surface portion 651 Inner radial side wall surface part
652 Outer radial side wall surface part
653 End portion wall surface part
654 End portion wall surface part
656 Wall surface portion
942 Case water passage
944 Case water passage
950 Meandering water passage
951 Inlet water passage
952 Outlet water passage
3561 Oil dropping hole
3581 Oil dropping hole
9501 First flow passage portion
9502 Second flow passage portion
BT Bolt
I Central axis

The invention claimed is:

1. A rotating electric machine comprising:
a stator core; and
a supporting member that has a cylindrical shape along an axial direction of the stator core and that supports the stator core, wherein:
   the supporting member forms a cooling water passage through which cooling water passes and an oil passage through which oil passes,
   the stator core, the cooling water passage, and the oil passage are disposed adjacent to each other in this order from an inner radial side,
   the cooling water passage and the oil passage extend in a circumferential direction in an extension range of the stator core in the axial direction,
   the cooling water passage is formed in a cavity of the supporting member such that the supporting member is between the cooling water passage and the stator core, and
   the oil passage includes recessed oil passages that are adjacent to a meandering water passage of the cooling water passage in the circumferential direction such that the recessed oil passages overlap the meandering water passage in the circumferential direction with a partition wall located between the recessed oil passages and the meandering water passage.

2. The rotating electric machine according to claim 1, further comprising:
an oil circulation portion that circulates the oil through the oil passage,
wherein the oil circulated by the oil circulation portion is supplied to a part of the rotating electric machine.

3. The rotating electric machine according to claim 2, further comprising:
a cooling water circulation portion that circulates the cooling water through the cooling water passage, wherein:
   the cooling water circulation portion includes a heat exchange portion that removes heat from the cooling water, and
   the oil circulation portion does not include an oil cooler.

4. The rotating electric machine according to claim 3, wherein
   the supporting member has an oil dropping hole in a zenith region for dropping the oil on a coil end mounted on the stator core,
   the oil passage is in communication with the oil dropping hole, and
   an oil inlet portion for introducing the oil into the oil passage is provided in a lowermost region of the supporting member.

5. The rotating electric machine according to claim 1, wherein
   the supporting member has an oil dropping hole in a zenith region for dropping the oil on a coil end mounted on the stator core,
   the oil passage is in communication with the oil dropping hole, and
   an oil inlet portion for introducing the oil into the oil passage is provided in a lowermost region of the supporting member.

6. The rotating electric machine according to claim 1, wherein
   the supporting member supports the stator core in a manner in which an outer peripheral surface of the stator core is in surface contact with an inner peripheral surface of the supporting member,
   the supporting member has a boundary surface between the cooling water passage and the oil passage, and
   the stator core and the cooling water are allowed to exchange heat via the inner peripheral surface and the cooling water and the oil are allowed to exchange heat via the boundary surface.

* * * * *